US012049922B2

(12) United States Patent
Gonzalez

(10) Patent No.: US 12,049,922 B2
(45) Date of Patent: Jul. 30, 2024

(54) CORROSION RESISTANT BEARING ELEMENTS, BEARING ASSEMBLIES, BEARING APPARATUSES, AND MOTOR ASSEMBLIES USING THE SAME

(71) Applicant: US Synthetic Corporation, Orem, UT (US)

(72) Inventor: Jair Jahaziel Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 18/201,322

(22) Filed: May 24, 2023

(65) Prior Publication Data

US 2023/0296134 A1    Sep. 21, 2023

Related U.S. Application Data

(63) Continuation of application No. 17/148,145, filed on Jan. 13, 2021, now Pat. No. 11,686,347, which is a
(Continued)

(51) Int. Cl.
*F16C 33/12* (2006.01)
*C04B 35/58* (2006.01)
(Continued)

(52) U.S. Cl.
CPC ...... *F16C 33/121* (2013.01); *C04B 35/58007* (2013.01); *F16C 33/043* (2013.01);
(Continued)

(58) Field of Classification Search
CPC ...... F16C 17/246; F16C 33/043; F16C 33/12; F16C 33/121; F16C 33/14; F16C 33/26;
(Continued)

(56) References Cited

U.S. PATENT DOCUMENTS 4,241,135 A    12/1980   Lee et al.
4,268,276 A     5/1981   Bovenkerk
(Continued)

FOREIGN PATENT DOCUMENTS

CN      102066787 A     5/2011
DE   102013213853 A1    1/2015
(Continued)

OTHER PUBLICATIONS

International Search Report and Written Opinion from International Application No. PCT/US2019/013604 mailed Jul. 15, 2019.
(Continued)

*Primary Examiner* — Alan B Waits
(74) *Attorney, Agent, or Firm* — Dorsey & Whitney LLP

(57) ABSTRACT

Embodiments disclosed herein relate to bearing assemblies and methods of manufacturing. In an embodiment, a bearing assembly includes a support ring and bearing elements. The bearing elements are mounted to and distributed circumferentially about an axis of the support ring. At least one of the bearing elements includes a polycrystalline diamond table, a substrate bonded to the polycrystalline diamond table, bonding region defined by the substrate and the polycrystalline diamond table, and a corrosion resistant region. The corrosion resistant region includes a corrosion resistant material that covers at least a portion of at least one lateral surface of the bonding region. The corrosion resistant region prevents corrosion of at least some material in the bonding region covered by the corrosion resistant region (e.g., during use). Other embodiments employ one or more sacrificial anodes as an alternative to or in combination with the corrosion resistant region.

18 Claims, 14 Drawing Sheets

Related U.S. Application Data continuation of application No. 16/489,438, filed as application No. PCT/US2019/013604 on Jan. 15, 2019, now Pat. No. 10,920,822.

(60) Provisional application No. 62/687,080, filed on Jun. 19, 2018, provisional application No. 62/620,840, filed on Jan. 23, 2018.

(51) Int. Cl.
  *E21B 4/00* (2006.01)
  *F16C 3/04* (2006.01)
  *F16C 33/04* (2006.01)
  *F16C 33/26* (2006.01)

(52) U.S. Cl.
  CPC .............. *F16C 33/12* (2013.01); *F16C 33/26* (2013.01); *E21B 4/003* (2013.01); *F16C 2204/40* (2013.01); *F16C 2206/04* (2013.01); *F16C 2206/82* (2013.01); *F16C 2352/00* (2013.01)

(58) Field of Classification Search
  CPC .............. F16C 2204/40; F16C 2206/04; F16C 2206/82; F16C 2352/00; E21B 4/003; C04B 35/521; C04B 35/58007
  See application file for complete search history.

(56) References Cited

U.S. PATENT DOCUMENTS

| | | | |
|---|---|---|---|
| 4,410,054 A | 10/1983 | Nagel et al. | |
| 4,452,539 A | 6/1984 | Evans et al. | |
| 4,468,138 A | 8/1984 | Nagel | |
| 4,560,014 A | 12/1985 | Geczy | |
| 4,738,322 A | 4/1988 | Hall et al. | |
| 4,811,801 A | 3/1989 | Salesky et al. | |
| 4,913,247 A | 4/1990 | Jones | |
| 5,016,718 A | 5/1991 | Tandberg | |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenstrom et al. | |
| 5,180,022 A | 1/1993 | Brady | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,510,193 A | 4/1996 | Cerutti et al. | |
| 5,544,713 A | 8/1996 | Dennis | |
| 5,833,021 A | 11/1998 | Mensa-wilmot et al. | |
| 5,875,862 A | 3/1999 | Jurewicz et al. | |
| 6,793,681 B1 | 9/2004 | Pope et al. | |
| 6,872,356 B2 | 3/2005 | Butcher et al. | |
| 7,368,079 B2 | 5/2008 | Yao et al. | |
| 7,678,325 B2 | 3/2010 | Gardinier | |
| 7,703,982 B2 | 4/2010 | Cooley | |
| 7,726,421 B2 | 6/2010 | Middlemiss | |
| 7,866,418 B2 | 1/2011 | Bertagnolli et al. | |
| 8,202,335 B2 | 6/2012 | Cooley et al. | |
| 8,297,382 B2 | 10/2012 | Bertagnolli et al. | |
| 8,309,050 B2 | 11/2012 | Keshavan et al. | |
| 8,616,306 B2 | 12/2013 | Bertagnolli et al. | |
| 8,662,210 B2 | 3/2014 | Mukhopadhyay et al. | |
| 8,678,657 B1 | 3/2014 | Knuteson et al. | |
| 8,727,044 B2 | 5/2014 | Qian et al. | |
| 8,753,562 B2 | 6/2014 | Wardoyo et al. | |
| 8,757,299 B2 | 6/2014 | Digiovanni et al. | |
| 8,863,864 B1 | 10/2014 | Miess | |
| 8,961,030 B2 | 2/2015 | Kirchhoff et al. | |
| 9,080,385 B2 | 7/2015 | Sexton et al. | |
| 9,144,886 B1 | 9/2015 | Gleason et al. | |
| 9,163,660 B1 * | 10/2015 | Sexton | F16C 33/121 |
| 9,175,726 B2 | 11/2015 | Beresch et al. | |
| 9,227,302 B1 | 1/2016 | Gleason | |
| 9,539,703 B2 | 1/2017 | Bao | |
| 9,550,276 B1 | 1/2017 | Gleason et al. | |
| 9,702,198 B1 | 7/2017 | Topham | |
| 9,732,563 B1 | 8/2017 | Mukhopadhyay | |
| 9,844,854 B1 | 12/2017 | Gleason et al. | |
| 10,315,175 B2 | 6/2019 | Bao et al. | |
| 10,920,822 B2 | 2/2021 | Gonzalez | |
| 2004/0140132 A1 | 7/2004 | Middlemiss | |
| 2010/0170671 A1 | 7/2010 | Sihler | |
| 2011/0023375 A1 | 2/2011 | Sani et al. | |
| 2011/0067929 A1 | 3/2011 | Mukhopadhyay et al. | |
| 2011/0192093 A1 | 8/2011 | Wardoyo et al. | |
| 2011/0259648 A1 | 10/2011 | Sani | |
| 2012/0261197 A1 | 10/2012 | Miess et al. | |
| 2013/0043078 A1 | 2/2013 | Qian et al. | |
| 2014/0373458 A1 | 12/2014 | Miess | |
| 2016/0016290 A1 | 1/2016 | Miess et al. | |
| 2016/0047430 A1 | 2/2016 | Glidewell | |
| 2016/0333932 A1 | 11/2016 | Iwata et al. | |

FOREIGN PATENT DOCUMENTS

| | | |
|---|---|---|
| JP | 2006143815 A | 6/2006 |
| WO | 2008081650 A1 | 7/2008 |
| WO | 2014011855 A1 | 1/2014 |
| WO | 2015055187 A1 | 4/2015 |
| WO | 2017034788 A1 | 3/2017 |

OTHER PUBLICATIONS

Issue Notification for U.S. Appl. No. 15/131,687 mailed Jun. 26, 2019.
Issue Notification for U.S. Appl. No. 16/489,438 mailed Jan. 27, 2021.
Issue Notification for U.S. Appl. No. 16/685,435 mailed Jul. 13, 2022.
Non-Final Office Action for U.S. Appl. No. 15/131,687 mailed Sep. 20, 2018.
Non-Final Office Action for U.S. Appl. No. 16/430,891 mailed Jul. 16, 2019.
Non-Final Office Action for U.S. Appl. No. 16/489,438 mailed Jun. 25, 2020.
Non-Final Office Action for U.S. Appl. No. 16/685,435 mailed Dec. 10, 2021.
Non-Final Office Action for U.S. Appl. No. 17/148,145 mailed Aug. 22, 2022.
Non-Final Office Action for U.S. Appl. No. 17/148,145 mailed Dec. 21, 2021.
Notice of Allowance for U.S. Appl. No. 15/131,687 mailed Mar. 8, 2019.
Notice of Allowance for U.S. Appl. No. 16/489,438 mailed Oct. 13, 2020.
Notice of Allowance for U.S. Appl. No. 16/685,435 mailed Mar. 31, 2022.
Notice of Allowance for U.S. Appl. No. 17/148,145 mailed Feb. 27, 2023.
Notice of Allowance for U.S. Appl. No. 17/148,145 mailed May 10, 2022.
U.S. Appl. No. 15/131,687, filed Apr. 18, 2016.
U.S. Appl. No. 16/430,891, filed Jun. 4, 2019.
U.S. Appl. No. 16/489,438, filed Aug. 28, 2019.
U.S. Appl. No. 16/685,435, filed Nov. 15, 2019.
U.S. Appl. No. 62/150,621, filed Apr. 21, 2015.
U.S. Appl. No. 62/620,840, filed Jan. 23, 2018.
U.S. Appl. No. 62/687,080, filed Jun. 19, 2018.
U.S. Appl. No. 62/730,137, filed Sep. 12, 2018.
U.S. Appl. No. 62/804,801, filed Feb. 13, 2019.

* cited by examiner

CORROSION RESISTANT BEARING ELEMENTS, BEARING ASSEMBLIES, BEARING APPARATUSES, AND MOTOR ASSEMBLIES USING THE SAME

CROSS-REFERENCE TO RELATED APPLICATIONS

This application is a continuation of U.S. application Ser. No. 17/148,145 filed 13 Jan. 2021, which is a continuation of U.S. application Ser. No. 16/489,438 filed 28 Aug. 2019, which is a National Phase of International Application No. PCT/US2019/013604 filed 15 Jan. 2019, which claims priority to U.S. Provisional Application No. 62/620,840 filed on 23 Jan. 2018 and U.S. Provisional Application No. 62/687,080 filed on 19 Jun. 2018. The disclosure of each of the foregoing applications is incorporated herein, in its entirety, by this reference.

BACKGROUND

Subterranean drilling systems that employ downhole drilling motors are commonly used for drilling boreholes in the earth for oil and gas exploration and production. Such a subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole can be connected to the output shaft. As the borehole is drilled with the rotary drill bit, pipe sections may be connected to the subterranean drilling system to form a drill string capable of progressively drilling the borehole to a greater size or depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to help cool and lubricate the bearing elements of the thrust-bearing apparatuses. This drilling fluid that helps cool and lubricate the bearing elements, however, also corrodes metal-solvent catalysts in the bearing element.

The operational lifetime of the thrust-bearing apparatuses often can determine the useful life of the subterranean drilling system. Therefore, manufacturers and users of bearing apparatuses and subterranean drilling systems continue to seek improved bearing assemblies and apparatuses with a longer useful life.

SUMMARY

Embodiments disclosed herein relate to bearing assemblies, bearing apparatuses, motors, pumps, or other mechanical assemblies that include bearing elements or support rings having corrosion resistant properties configured to protect the bearing elements from leaching, galvanic, or electrochemical corrosion that may occur when the bearing assembly comes in contact with lubrication or cooling fluid. In an embodiment, a bearing assembly includes a support ring and a plurality of bearing elements. The plurality of bearing elements are mounted to and distributed circumferentially about an axis of the support ring. At least one bearing element of the plurality of bearing elements includes a polycrystalline diamond table, a substrate, a bonding region, and a corrosion resistant region. The polycrystalline diamond table has a bearing surface. The polycrystalline diamond table includes a plurality of bonded diamond grains defining a plurality of interstitial regions at least partially occupied by a metal-solvent catalyst. The substrate is bonded to the polycrystalline diamond table. The bonding region is defined by the substrate and the polycrystalline diamond table. The bonding region includes at least one lateral surface extending between the base surface of the substrate and the bearing surface of the polycrystalline diamond table. The corrosion resistant region includes a corrosion resistant material that covers at least a portion of the at least one lateral surface of the bonding region. The corrosion resistant region is configured to prevent corrosion of at least some material covered by the corrosion resistant region.

In an embodiment, a method for manufacturing a bearing assembly includes providing a plurality of bearing elements. Each bearing element of the plurality of bearing elements includes a polycrystalline diamond table, a substrate, and a bonding region. The polycrystalline diamond table has a bearing surface. The polycrystalline diamond table includes a plurality of bonded diamond grains defining a plurality of interstitial regions at least partially occupied by a metal-solvent catalyst. The substrate is bonded to the polycrystalline diamond table. The bonding region is defined by the substrate and the polycrystalline diamond table. The bonding region includes at least one lateral surface extending between the base surface of the substrate and the bearing surface of the polycrystalline diamond table. The method also includes disposing a corrosion resistant material about at least one bearing element of the plurality of bearing elements to form a corrosion resistant region. The corrosion resistant material covers at least a portion of the at least one lateral surface of the bonding region. The corrosion resistant region is configured to prevent corrosion of at least some material covered by the corrosion resistant region when the at least one bearing element is exposed to lubricant, process fluid, cooling fluid, or any other fluid. The method also includes securing the plurality of bearing elements circumferentially about an axis of a support ring.

In an embodiment, a bearing assembly includes a support ring, a plurality of bearing elements, and one or more sacrificial anodes. The plurality bearing elements are mounted to and distributed circumferentially about an axis of the support ring. Each bearing element of the plurality of bearing elements includes a polycrystalline diamond table bonded to a substrate. The polycrystalline diamond table has a bearing surface. The polycrystalline diamond table includes a plurality of bonded diamond grains defining a plurality of interstitial regions at least partially occupying by a metal-solvent catalyst. The one or more sacrificial anodes are attached to the support ring.

In an embodiment, a method for manufacturing a bearing assembly includes providing a plurality of bearing elements. Each bearing element of the plurality of bearing elements includes a polycrystalline diamond table bonded to a substrate. The polycrystalline diamond table has a bearing surface. The polycrystalline diamond table includes a plurality of bonded diamond grains defining a plurality of interstitial regions at least partially occupied by a metal-solvent catalyst. The method also includes mounting the plurality of bearing elements to a support ring so that the plurality of bearing elements are circumferentially about an axis of the support ring. The method also includes disposing one or more sacrificial anodes on the support ring.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments disclosed herein relate to bearing assemblies, bearing apparatuses, motors, pumps, or other mechanical assemblies that include bearing elements or support rings having corrosion resistant properties configured to protect the bearing elements from leaching/galvanic corrosion that may occur when the bearing assembly comes in contact with lubrication, process fluid, cooling fluid, or any other fluid. More particularly, the corrosion resistant regions and/or sacrificial anodes of the bearing assemblies described in greater detail herein are configured to prevent corrosion of at least some of the metal-solvent catalyst of the bearing element and/or other material when the bearing is exposed to lubricant or cooling fluid. Embodiments disclosed herein may be applied to all types of bearings, such as thrust bearings, radial bearings, combination thrust/radial bearings, taper bearings, spherical bearings, titling pad bearings, or continuous runner bearings with no gaps and solid phase.

Figure 1A:
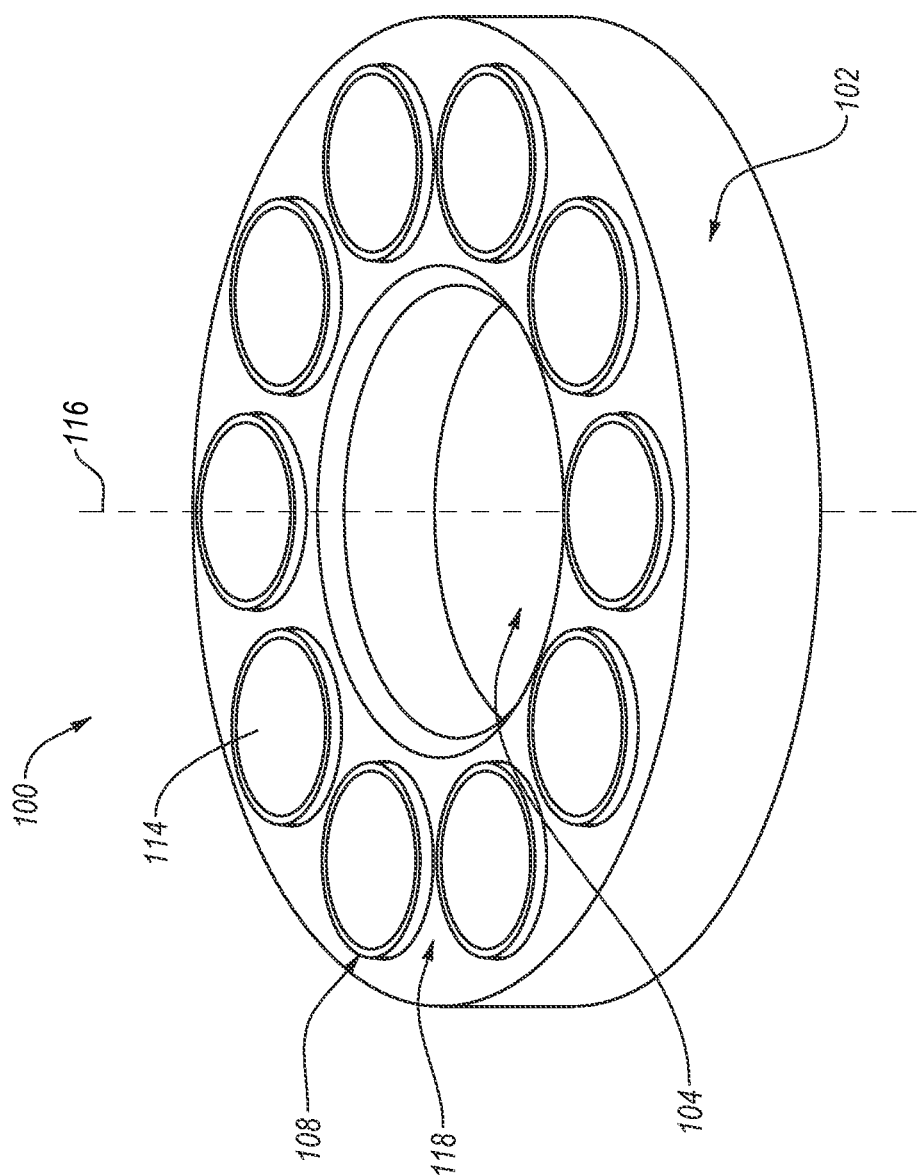
FIG. 1A is an isometric view of a thrust-bearing assembly, according to an embodiment.
Figure 1B:
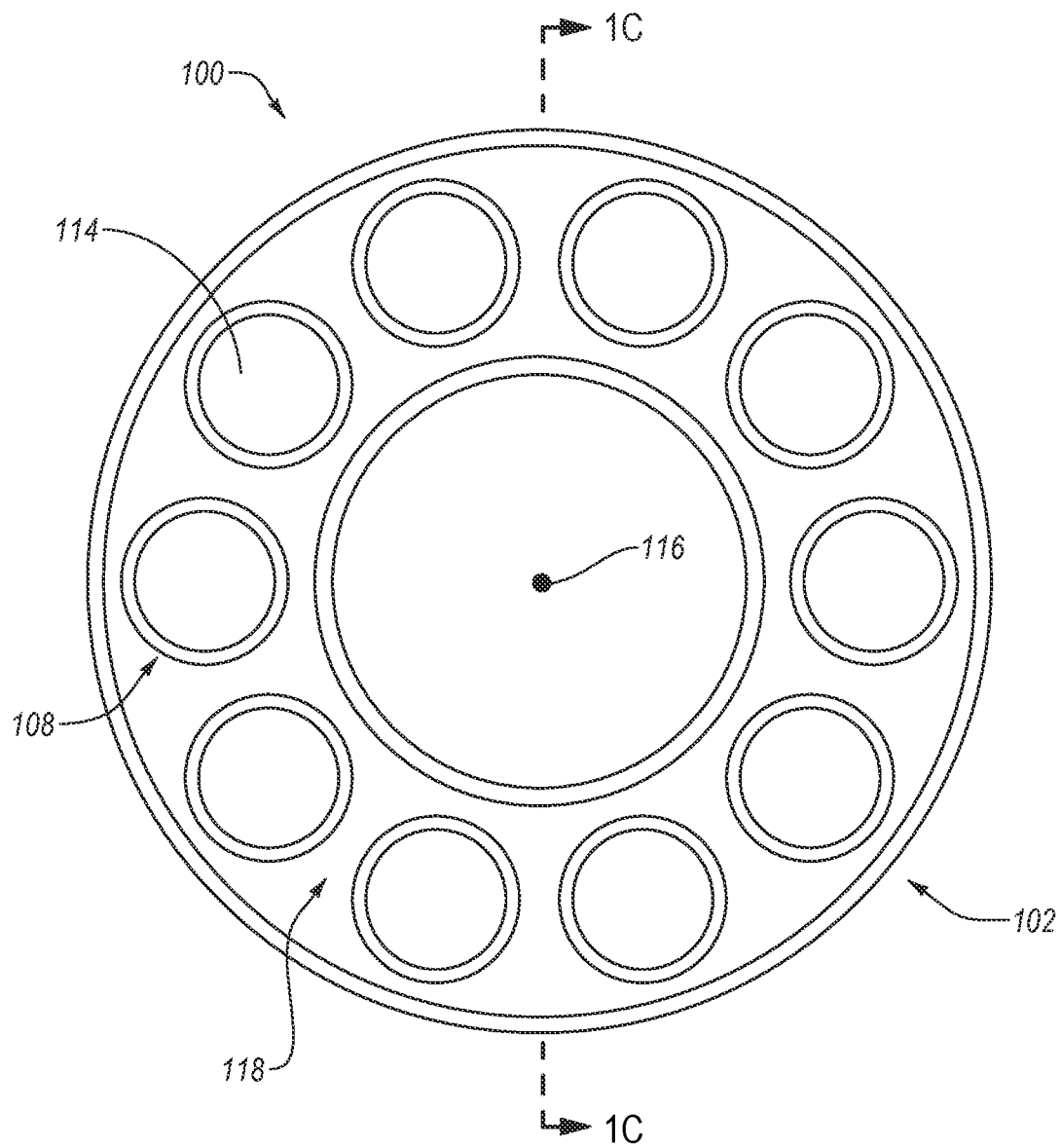
FIG. 1B is a top plan view of the thrust-bearing assembly shown in FIG. 1A.

FIGS. 1A and 1B are isometric and top plan views of a thrust-bearing assembly 100 according to an embodiment. The thrust-bearing assembly 100 may form a stator or a rotor of a thrust-bearing apparatus (e.g., used as a subterranean drilling system). As shown in FIGS. 1A and 1B, the thrust-bearing assembly 100 may include a support ring 102 defining an opening 104 through which a shaft (not shown) of, for example, a downhole drilling motor may extend. The support ring 102 may be made from a variety of different materials. For example, the support ring 102 may comprise a metal (e.g., titanium, aluminum, etc.), alloy steel, a metal alloy, carbon steel, stainless steel, tungsten carbide, or any other suitable metal or conductive, magnetic or non-magnetic, or non-conductive material. The support ring 102 may include a plurality of recesses 106 (shown in FIG. 1C) formed therein.

The thrust-bearing assembly 100 may further include a plurality of bearing elements 108. In an embodiment, one or more of the bearing elements 108 may have a generally cylindrical shaped body. While the bearing elements 108 are shown having a generally cylindrically shaped body, the one or more of the bearing elements may have a generally rounded rectangular shaped body, a generally oval shaped body, a generally wedge shaped body, or any other suitable shaped body.

Figure 1C:
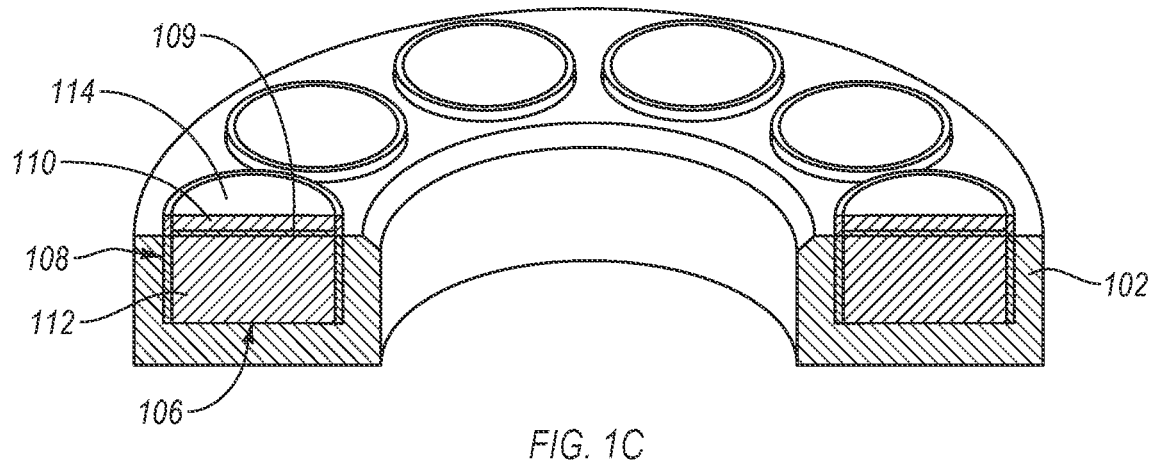
FIG. 1C is an isometric cutaway view taken along line 1C-1C of the thrust-bearing assembly shown in FIG. 1B.

Referring to FIG. 1C, the bearing elements 108 may include a superhard table 110, a substrate 110 bonded to the superhard table 110, and a bonding region 109 defined by the substrate 110 and the superhard table 110. The superhard table 110 includes a bearing surface 114 distal to the bonding region 109, and at least one lateral surface 111 extending between the bearing surface 114 and the bonding region 109 of the superhard table 110. The superhard table 110 may be bonded to an interfacial surface 113 of the substrate 112. The substrate 112 may further include a base surface 115 distal to the interfacial surface 113, and at least one lateral surface 117 extending between the base surface 115 and the interfacial surface 113. The bonding region may include polycrystalline diamond ("PCD"), carbide (e.g., tungsten carbide), and a cementing constituent from the substrate 112 (e.g., cobalt). The bonding region 109 of the superhard table 110 has a thickness that may be about 1 µm or more, such about 1 µm to about 100 µm, about 10 µm to about 100 µm, about 30 µm to about 70 µm, or about 15 µm to about 30 µm. Thus, the bonding region 109 includes part of the superhard table 110 and the substrate 112, including the at least one lateral surface 111 of the superhard table 110 and the at least one lateral surface 117 of the substrate 112. Although the bonding region 109 is illustrated as being substantially planar, it should be understood that it may have a nonplanar geometry due to the geometry of the substrate and/or the interpenetrating of material from the substrate 112 with material from the superhard table 110.

The bearing elements 108 are illustrated in FIGS. 1A and 1B being distributed circumferentially about a thrust axis 116 along which a thrust force may be generally directed during use. As shown, gaps 118 may be located circumferentially between adjacent ones of the bearing elements 108. In an embodiment, at least one of, some of, or all of the gaps 118 may exhibit a width of about 0.00020 inches to 0.100 inches, such as about 0.00040 inches to 0.0010 inches, or about 0.00040 inches to 0.080 inches. In other embodiments, the gaps 118 may have widths that are relatively larger or smaller. In other embodiments, the gaps 118 may substantially be zero. In some embodiments, one portion of the rotor may include relatively smaller gaps between bearing elements, while another portion of the bearing may include relatively larger gaps between bearing elements. For example, the gap size between bearing elements of the stator may be relatively smaller compared to the gap size between bearing elements of the rotor.

Each of the bearing elements 108 may be partially disposed in a corresponding one of the recesses 106 (shown in FIG. 1C which is an isometric cutaway view taken along line 1C-1C of the thrust-bearing assembly shown in FIG. 1B) of the support ring 102 and secured partially therein via brazing, press-fitting, threadedly attaching, fastening with a fastener, combinations of the foregoing, or another suitable technique. The bearing elements 108 may be pre-machined to tolerances and mounted in the support ring 102 and/or mounted to the support ring 102 and the bearing surfaces 114 thereof and planarized (e.g., by lapping and/or grinding) so that the bearing surfaces 114 are substantially coplanar. Optionally, one or more of the bearing elements 108 may exhibit a peripherally extending edge chamfer. However, in other embodiments, the edge chamfer may be omitted.

FIGS. 2A-4D are isometric and cross-sectional views of different bearing element embodiments for use with the thrust-bearing assembly 100. Thus, while the bearing element 108 is shown in the thrust-bearing assembly 100 shown in FIGS. 1A-1C, other bearing element embodiments described herein may be used in place of or in addition to the bearing element 108 shown in FIGS. 1A-1C. In some embodiments, each bearing element can be referred to as a "superhard bearing element." As used herein, a "superhard bearing element" is a bearing element including a bearing surface that is made from a material exhibiting a hardness that is at least as hard as tungsten carbide.

The superhard table 110 may be made from a number of different superhard materials. For example, the superhard table 110 may comprise polycrystalline diamond and the substrate 112 may comprise cobalt-cemented tungsten carbide. Suitable materials for use in the superhard table 110 include natural diamond, sintered PCD, polycrystalline cubic boron nitride, diamond grains bonded together with silicon carbide, or combinations of the foregoing. In an embodiment, the superhard table 110 comprises a PCD table that includes a plurality of directly bonded-together diamond grains exhibiting diamond-to-diamond bonding therebetween (e.g., $sp^3$ bonding), which define a plurality of interstitial regions. A portion of or substantially all of the interstitial regions of such a superhard table 110 may include a metal-solvent catalyst or a metallic infiltrant disposed therein that is infiltrated from the substrate 112 or from another source. For example, the metal-solvent catalyst or metallic infiltrant may be selected from iron, nickel, cobalt, and alloys of the foregoing. The superhard table 110 may further include a thermally-stable diamond region in which the metal-solvent catalyst or metallic infiltrant has been partially or substantially depleted from such selected region (e.g., along one or more surfaces or volumes) of the superhard table 110 using, for example, an acid leaching process to a depth of about 5 µm to about 250 µm, about 10 µm to about 100 µm, or about 30 µm to about 150 µm.

The diamond particles that may be used to fabricate the superhard table 110 in a high-pressure/high-temperature process ("HPHT)" may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 40 µm, 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1.5 µm, 1 µm, 0.75 µm, 0.5 µm, less than 0.5 µm, 0.25 µm, less than 0.25 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the bearing elements 108 may be free-standing (e.g., substrateless) and formed from a polycrystalline diamond body that is at least partially or fully leached to remove a metal-solvent catalyst initially used to sinter the polycrystalline diamond body.

More details about bearing elements and techniques for forming such bearing elements are disclosed in U.S. Pat.

Nos. 7,866,418 and 8,616,306, the disclosures of which are incorporated herein, in their entirety, by this reference.

One or more of the bearing elements 108 includes a corrosion resistant region. The corrosion resistant region may include a corrosion resistant material that covers at least a portion of the bonding region 109 of the superhard table 110. The corrosion resistant region is configured to prevent corrosion of at least some of the metal-solvent catalyst and/or other material covered by the corrosion resistant region during use (e.g., when the bearing element is exposed to lubricant, such as a lubricating filling fluid described in relation to FIG. 5B). For example, the metal-solvent catalyst may preferentially corrode when the bearing element is exposed to lubricant or other fluids due to galvanic corrosion. For example, the metal-solvent catalyst may preferentially corrode over the substrate 112 and/or the support ring 102. The corrosion resistant material may include one or more of a ceramic or a refractory metal. If the corrosion resistant material includes ceramic, then the ceramic may include one or more of alumina, silicon carbide, tungsten carbide, diamond, or any combination thereof. If the corrosion resistant material includes the refractory metal, then the refractory metal may include one or more of tungsten, niobium, molybdenum, zirconium, tantalum, vanadium, chromium, or alloys including one or more of the foregoing metals.

In some embodiments, the corrosion resistant region may include a coating that includes the corrosion resistant material and that is deposited on the bearing element 108. U.S. patent application Ser. No. 15/131,687 discloses various coatings and methods for coating that may be used on the bearing elements 108 to form the corrosion resistant region. The disclosure of U.S. patent application Ser. No. 15/131,687 is incorporated herein, in its entirety, by this reference. The coating, including the corrosion resistant material deposited and/or formed on the bearing element 108, may be brushed, sprayed, sputtered, vapor deposited such as chemical vapor deposited or physical vapor deposited, electrostatically deposited, positioned, electroplated, formed upon, electrolessly plated, or dipped onto or adjacent to one or more surfaces of the bearing element 108. For example, in some embodiments, the corrosion resistant region may include a chemical vapor deposited ("CVD") binderless tungsten carbide layer as disclosed in U.S. Pat. No. 8,202,335, the disclosure of which is incorporated herein, in its entirety, by this reference. For example, in some embodiments, the corrosion resistant region may include CVD polycrystalline diamond. The thickness of the coating may be about 1 µm or more, such about 1 µm to about 3 mm, about 100 µm to about 2 mm, about 5 µm to about 100 µm, about 5 µm to about 60 µm, or about 200 µm to about 1 mm.

In an embodiment, after providing at least a portion of the bearing element 108 with the coating, the bearing element 108 may be placed into an oxidizing environment, such as an oven or an enclosure (e.g., a tank or vessel) having an oxidizing agent (e.g., ambient oxygen) therein. More details about such oxidizing processes are disclosed in U.S. patent application Ser. No. 15/131,687, which was previously incorporated by reference. In an embodiment, forming a corrosion resistant region on the bearing may include heating the at least partially coated bearing element 108 in an ambient atmosphere. Heating the bearing element 108 may include heating the at least partially coated bearing element 108 in an oven, furnace, or induction coil to a temperature effective to react (e.g., oxidize) at least one or more surfaces of the bearing element 108. In an embodiment, heating the bearing element 108 may include heating to a temperature of about 500° C. or more, such as about 700° C. or more.

In some embodiments, the corrosion resistant region may include a ring or sleeve that includes the corrosion resistant material and that is disposed on the bearing 108. For example, the corrosion resistant region may include a ring that is press-fit, slip-fit, or brazed onto at least the superhard table 110 of the bearing 108.

FIGS. 2A-4D illustrate various embodiments of corrosion resistant regions. The corrosion resistant region covers at least a portion of the lateral surface 111 of the superhard table 110 at least proximate to the bonding region 109 of the superhard table 110. In some embodiments, the corrosion resistant region also may include at least a portion of a lateral surface 117 of the substrate 112 proximate to the interfacial surface thereof.

Figure 2A:
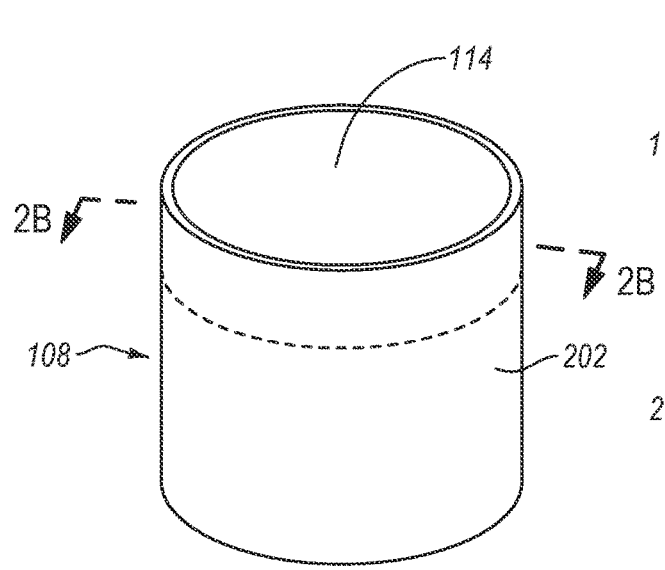
FIG. 2A is an isometric view of one of the bearing elements removed from the thrust-bearing assembly shown in FIG. 1A.
Figure 2B:
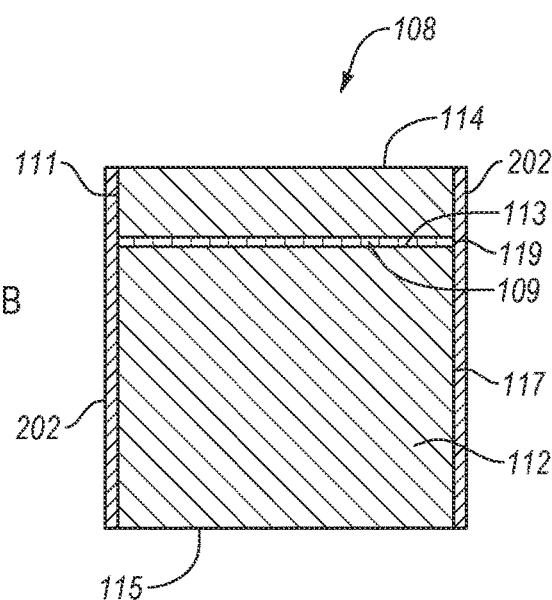
FIG. 2B is a cross-sectional view of the bearing element shown in FIG. 2A taken along line 2B-2B.

FIGS. 2A and 2B are isometric and cross-sectional views, respectively, of the bearing element 108 with a corrosion resistant region 202, according to an embodiment. The corrosion resistant region 202 may, according to an embodiment, cover substantially all of the lateral surface 111 of the superhard table 110, substantially all of a lateral surface 119 of the bonding region 109, and also substantially all of the lateral surface 117 of the substrate 112. In this and other embodiments, the corrosion resistant region 302 may not cover the base surface 115 of the substrate 112 or the bearing surface 114 of the superhard table 110, even if the corrosion resistant region 202 covers substantially all of the lateral surface 117 of the substrate 112. If the corrosion resistant region 202 is not wettable by a brazing alloy, leaving the base surface 115 uncoated provides at least one surface that the braze alloy can wet to promote effective metallurgical bonding between the support ring 102 and the bearing element 108. In some embodiments, if the corrosion resistant region 202 is wettable by a braze alloy, the corrosion resistant region 202 may cover the base surface 115 of the substrate 112 while also covering substantially all of the lateral surface 111 of the superhard table 110 and also substantially all of the lateral surface 117 of the substrate 112, according to an embodiment.

When the corrosion resistant region 202 covers substantially all of the lateral surface 111 of the superhard table 110 and also substantially all of the lateral surface 117 of the substrate 112, the corrosion resistant region 202 may include a continuous, unbroken corrosion resistant region extending between the base surface 115 of the substrate 112 and the bearing surface 114 of the superhard table 110. In some embodiments, the corrosion resistant region 202 may include two or more corrosion resistant regions stacked longitudinally between the base surface 115 of the substrate 112 and the bearing surface 114 of the superhard table 110. More particularly, the corrosion resistant region 202 may include a first corrosion resistant region covering substantially all of the lateral surface 111 of the superhard table 110 and a second corrosion resistant region adjacent to the first resistant region and covering substantially all of the lateral surface 117 of the substrate 112.

Figure 3A:
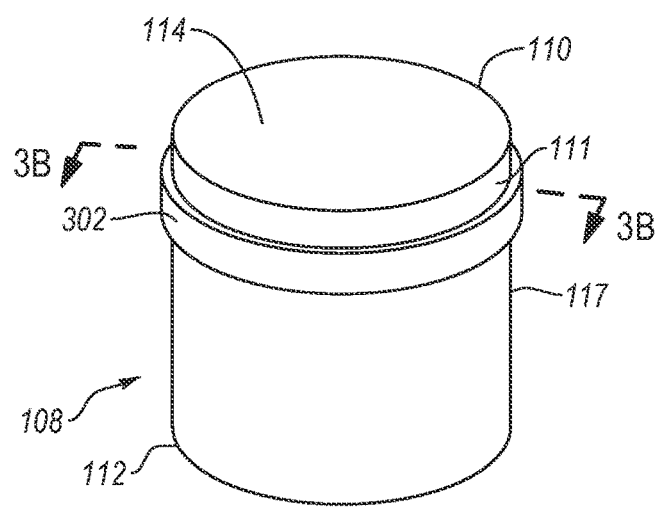
FIG. 3A is an isometric view of a bearing element for use with the thrust-bearing assembly shown in FIG. 1A, according to an embodiment.
Figure 3B:
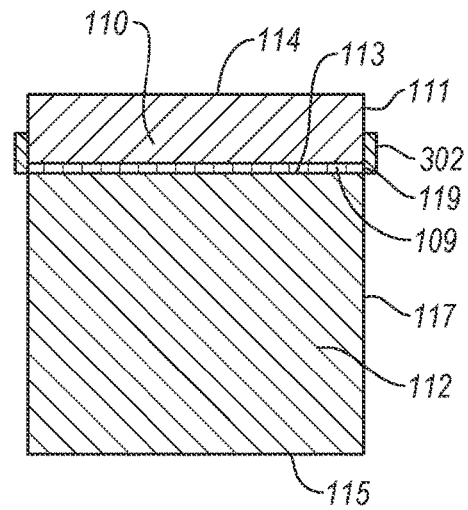
FIG. 3B is a cross-sectional view of the bearing element shown in FIG. 3A taken along line 3B-3B.

In some embodiments, the corrosion resistant region covers only a portion of the lateral surface 111 of the superhard table 110 at least proximate to the bonding region 109, and does not cover any of the lateral surface 117 of the substrate 112. FIGS. 3A and 3B are isometric and cross-sectional views, respectively, of the bearing element 108 with a corrosion resistant region 302 that covers only a portion of the lateral surface 111 proximate to the bonding region 109 and the bonding lateral surface 119 of the bonding region 109, according to an embodiment. When the corrosion resistant region 302 covers only a portion of the lateral surface 111 proximate to the bonding region 109, but covers neither the bearing surface 114 of the superhard table 110 nor the lateral surface 117 of the substrate 112, the corrosion resistant region 302 may comprise either a coating or a ring, as described in greater detail above.

In some embodiments, the corrosion resistant region 302 may extend from the interfacial surface 113 to within about 1 mm or more from the bearing surface 114, such as about 2 mm, 3 mm, 5 mm, or less than 1 mm from the bearing surface 114. In some embodiments, the corrosion resistant region 302 may cover about 95% or less of the lateral surface 111, such as about 90% or less, 80% or less, about 75% or less, about 66% or less, about 50% or less, about 33% or less, about 25% or less, about 50% to about 75%, or about 10% or more of the lateral surface 111, or ranges having endpoints of any of the above values in any combinations thereof.

Figure 4A:
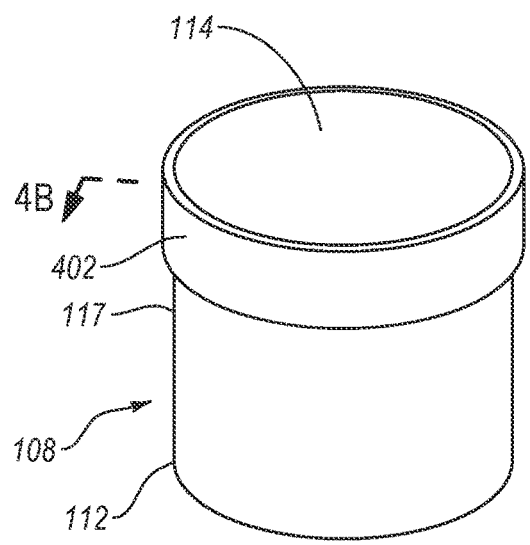
FIG. 4A is an isometric view of a bearing element for use with the thrust-bearing assembly shown in FIG. 1A, according to an embodiment.
Figure 4B:
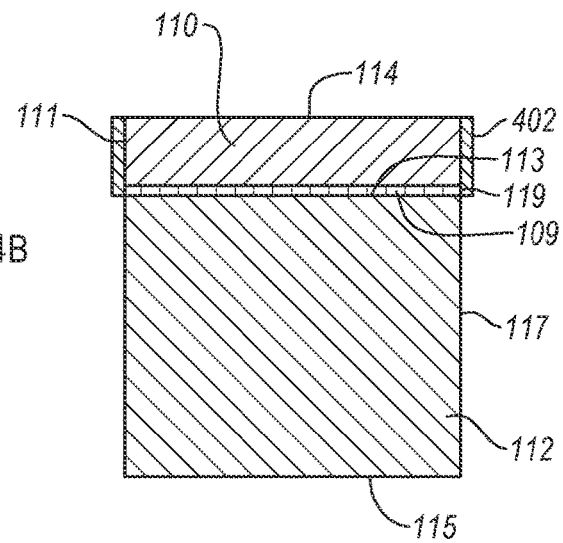
FIG. 4B is a cross-sectional view of the bearing element shown in FIG. 4A taken along line 4B-4B.

In some embodiments, the corrosion resistant region covers substantially all of the lateral surface 111 of the superhard table 110, and does not cover any of the lateral surface 117 of the substrate 112. FIGS. 4A and 4B are isometric and cross-sectional views, respectively, of the bearing element 108 with a corrosion resistant region 402 that covers substantially all of the lateral surface 111 and the bonding lateral surface 119 of the bonding region 109, according to an embodiment. When the corrosion resistant region 402 covers substantially all of the lateral surface 111, but covers neither the bearing surface 114 of the superhard table 110 nor the lateral surface 117 of the substrate 112, the corrosion resistant region 402 may comprise either a coating or a ring, as described in greater detail above. In some embodiments, the corrosion resistant region 402 may cover substantially all of the lateral surface 111 and also substantially all of the bearing surface 114 of the bearing element 108.

Figure 4C:
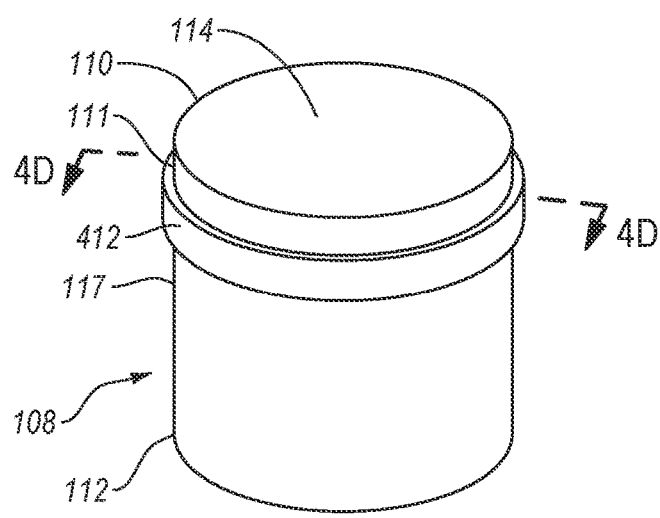
FIG. 4C is an isometric view of a bearing element for use with the thrust-bearing assembly shown in FIG. 1A, according to an embodiment.
Figure 4D:
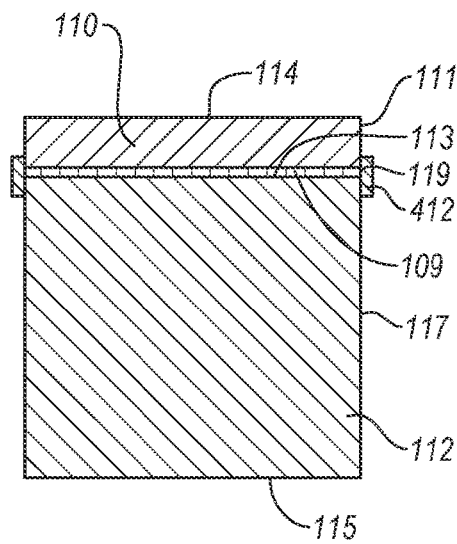
FIG. 4D is a cross-sectional view of the bearing element shown in FIG. 4C taken along line 4D-4D.

In some embodiments, the corrosion resistant region covers only a portion of the lateral surface 111 of the superhard table 110 at least proximate to the bonding region 109, and does not cover any of the lateral surface 117 of the substrate 112. FIGS. 4C and 4D are isometric and cross-sectional views, respectively, of the bearing element 108 with a corrosion resistant region 412 that covers only a portion of the lateral surface 111 proximate to the bonding region 109 or the bonding lateral surface 119 of the bonding region 109, and only a portion of the lateral surface 117 proximate to the interfacial surface 113, according to an embodiment. When the corrosion resistant region 412 covers only a portion of the lateral surface 111 proximate to the bonding region 109 and only a portion of the lateral surface 117 proximate to the interfacial surface 113, but does not cover the bearing surface 114 of the superhard table 110, the corrosion resistant region 412 may comprise either a coating or a ring, as described in greater detail above.

In some embodiments, the corrosion resistant region 412 may extend from the substrate to within about 1 mm or more from the bearing surface 114, such as about 2 mm, 3 mm, 5 mm, or less than 1 mm from the bearing surface 114. In some embodiments, the corrosion resistant region 412 may cover about 95% or less of the lateral surface 111, such as about 90% or less, 80% or less, about 75% or less, about 66% or less, about 50% or less, about 33% or less, about 25% or less, about 50% to about 75%, or about 10% or more of the lateral surface 111, or ranges having endpoints of any of the above values in any combinations thereof.

In some embodiments, the corrosion resistant region 412 may extend from the superhard table 110 to within about 1 mm or more from the base surface 115, such as about 2 mm, 3 mm, 5 mm, or less than 1 mm from the base surface 115. In some embodiments, the corrosion resistant region 412 may cover about 95% or less of the lateral surface 117, such as about 90% or less, 80% or less, about 75% or less, about 66% or less, about 50% or less, about 33% or less, about 25% or less, about 50% to about 75%, or about 10% or more of the lateral surface 111, or ranges having endpoints of any of the above values in any combinations thereof.

In yet another embodiment, only the bonding region 109 of the superhard table 110 and the lateral surface 117 of the substrate 112 are covered with a corrosion resistant region.

Figure 5A:
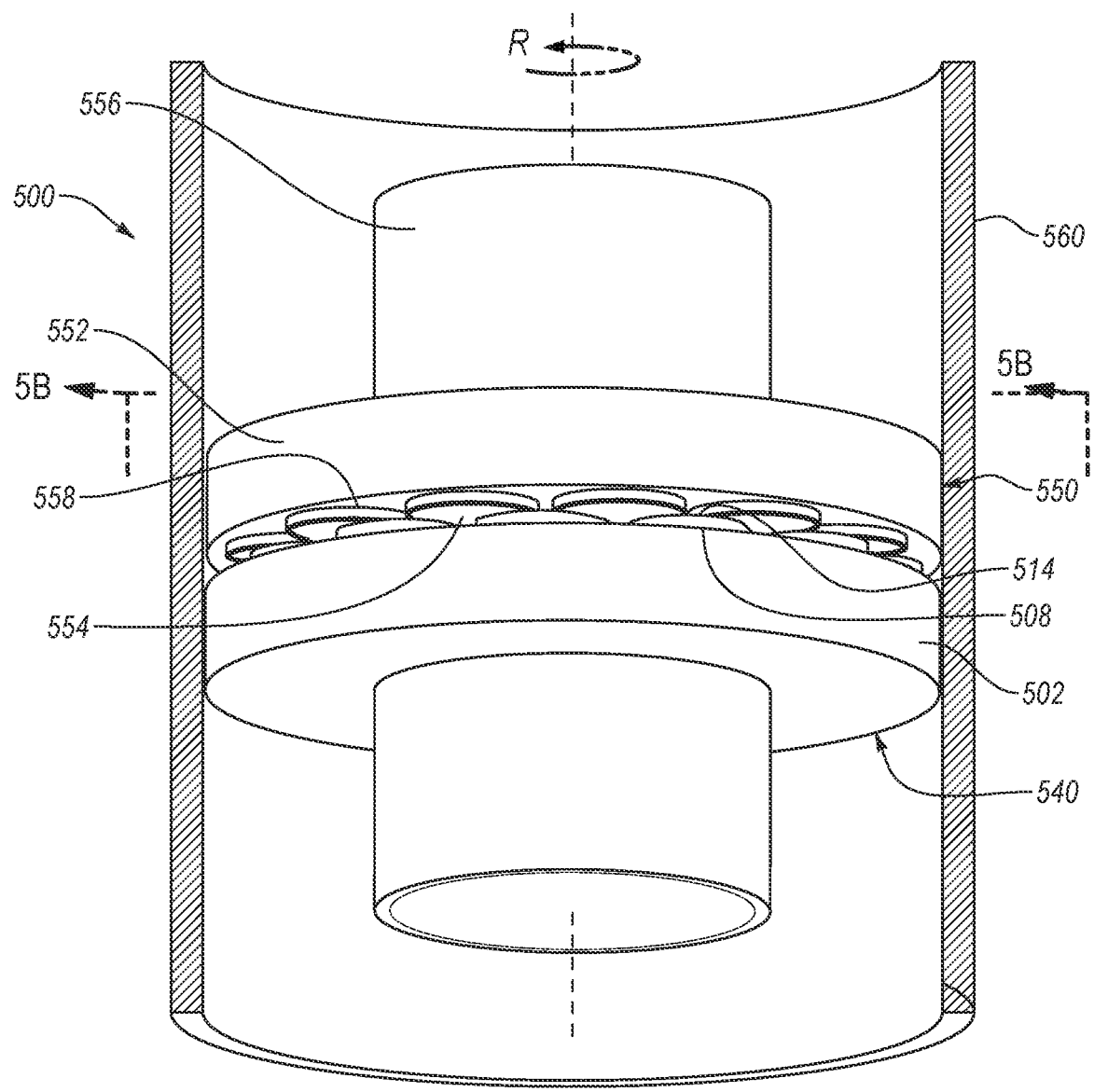
FIG. 5A is an isometric view of a thrust-bearing apparatus that may employ any of the disclosed thrust-bearing assemblies according to an embodiment, with the housing shown in cross-section.

Any of the above-described thrust-bearing assembly embodiments may be employed in a thrust-bearing apparatus. FIG. 5A is an isometric view of a thrust-bearing apparatus 500. The thrust-bearing apparatus 500 may include a stator 540 configured as any of the previously described embodiments of thrust-bearing assemblies. The stator 540 may include a plurality of circumferentially-adjacent bearing elements 508. The bearing elements 508 may include a bearing surface 514 and at least some of the bearing elements 508 may exhibit, for example, the configuration of the bearing elements 108. One or more of the bearing elements 508 include a corrosion resistant region, as described above. The bearing elements 508 may be mounted or otherwise attached to a support ring 502. The thrust-bearing apparatus 500 further may include a rotor 550. The rotor 550 may include a support ring 552 and a plurality of bearing elements 558 mounted or otherwise attached to the support ring 552, with each of the bearing elements 558 having a bearing surface 554. At least some of the bearing elements 558 may exhibit, for example, the configuration of the bearing elements 108 and one or more of the bearing elements 558 include a corrosion resistant region, as described above. As shown, a shaft 556 may be coupled to the support ring 552 and operably coupled to an apparatus capable of rotating the shaft 556 in a direction R (or in a generally opposite direction), such as a downhole motor. For example, the shaft 556 may extend through and may be secured to the support ring 552 of the rotor 550 by press-fitting or threadedly coupling the shaft 556 to the support ring 552 or another suitable technique. A housing 560 may be secured to the support ring 502 of the stator 540 and may extend circumferentially about the shaft 556 and the rotor 550.

Figure 5B:
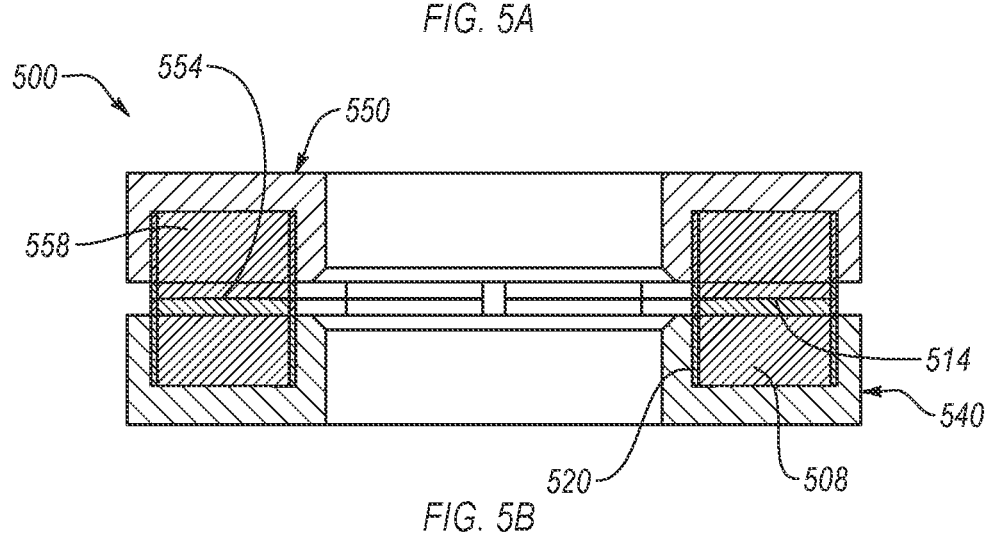
FIG. 5B is a cross-sectional view of the thrust-bearing apparatus shown in FIG. 5A taken along line 5B-5B.

FIG. 5B is a cross-sectional view in which the shaft 556 and housing 560 are not shown for clarity. In operation, lubricating filling fluid, or mud may be pumped between the shaft 556 and the housing 560, and between the bearing elements 558 of the rotor 550. Each of the bearing elements 508, 558 of thrust-bearing assembly 500 include one or more corrosion resistant regions 520 configured to protect the bearing elements 508, 558 from leaching that may occur when fluid is pumped between the shaft 556 and the housing 560 of the thrust-bearing assembly 500. For example, the one or more corrosion resistant regions 520 of each of the bearing elements 508, 558 may be configured to prevent corrosion of at least some of the metal-solvent catalyst of the bearing elements 508, 558 when fluid is pumped between the shaft 556 and the housing 560 of the thrust-bearing assembly 500.

Figure 6A:
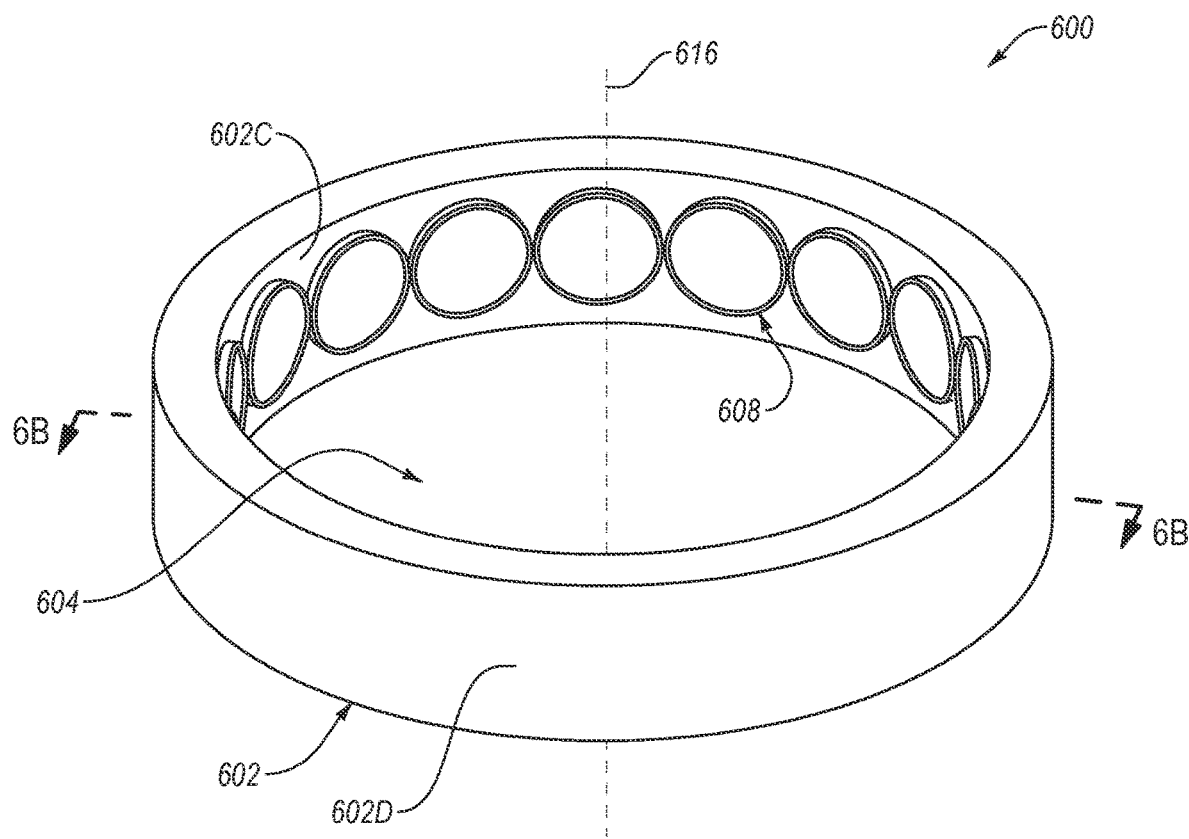
FIG. 6A is an isometric view of a radial bearing assembly, according to an embodiment.
Figure 6B:
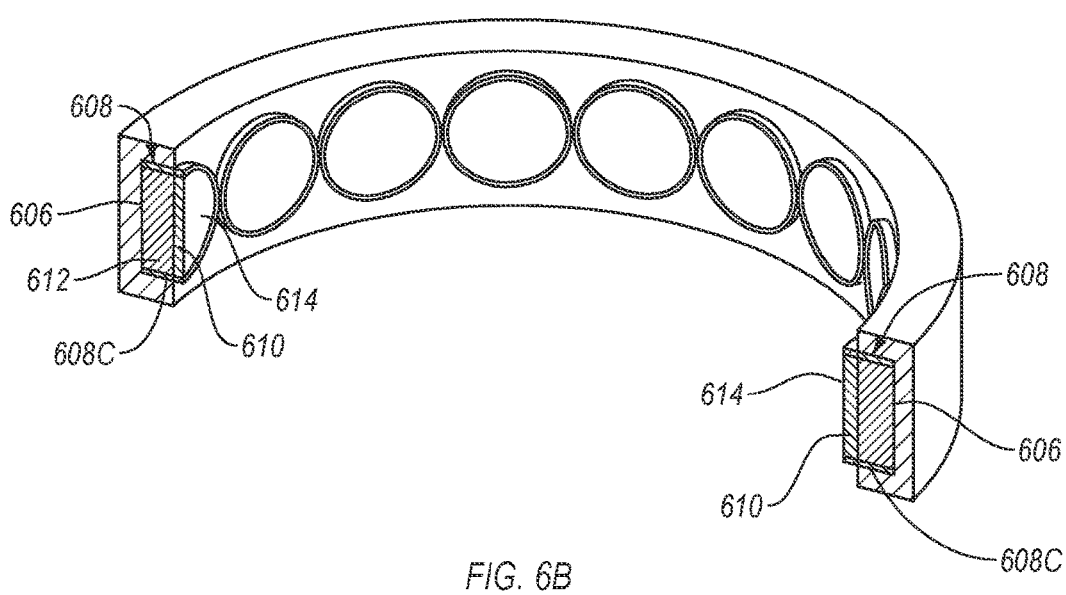
FIG. 6B is an isometric cutaway view of the radial bearing assembly shown in FIG. 6A.

Any feature or combination of features of any embodiment of the thrust-bearing assemblies and apparatuses described above may be employed in the radial bearing assemblies and apparatuses. FIGS. 6A and 6B are isometric and isometric cutaway views, respectively, illustrating a radial bearing assembly 600 according to an embodiment. The radial bearing assembly 600 may include a support ring 602 extending about a rotation axis 616. The support ring 602 may include an inner peripheral surface 602C defining a central opening 604 that is capable of receiving, for example, an inner support ring or inner race. The support ring 602 may also include an outer peripheral surface 602D. A plurality of bearing elements 608 may be distributed circumferentially about the rotation axis 616. Each bearing element 608 may include a superhard table 610 including a concavely-curved bearing surface 614 (e.g., curved to lie on an imaginary cylindrical surface). Each superhard table 610 may be bonded or attached to a corresponding substrate 612 (shown in FIG. 6B). The bearing elements 608 may have a generally cylindrical shape and each made from any of the materials discussed above for the bearing elements 108. In other embodiments, the bearing elements 608 may have a non-cylindrical shape, a generally wedge-like shape, a generally rectangular shape, a circular shape, or any other suitable shape. One or more of the bearing elements 608 include a corrosion resistant region 608C, as described above in any of the embodiments. As illustrated in FIGS. 6A and 6B, the bearing elements 608 may be distributed circumferentially about the rotation axis 616 in corresponding recesses 606 formed in the support ring 602 and arranged in a single row. In other embodiments, the bearing elements 608 may be circumferentially distributed in two rows, three rows, four rows, or any number of rows.

Figure 7:
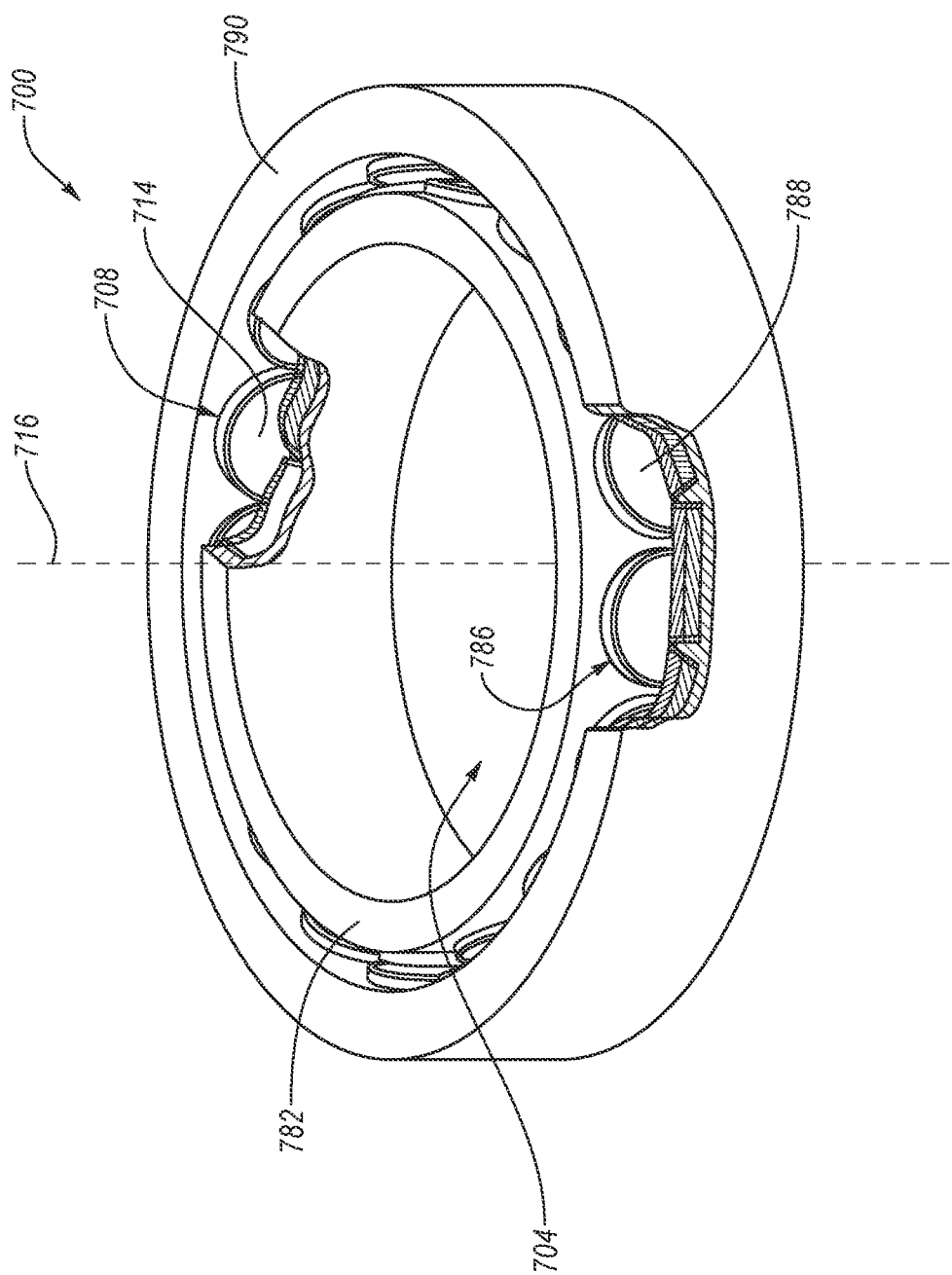
FIG. 7 is an isometric cutaway view of a radial bearing apparatus that may utilize any of the disclosed radial bearing assemblies, according to various embodiments.

FIG. 7 is an isometric cutaway view of a radial bearing apparatus 700 according to an embodiment. The radial bearing apparatus 700 may include an inner race 782 (i.e., a rotor). The inner race 782 may define an opening 704 and may include a plurality of circumferentially-adjacent bearing elements 786 distributed about a rotation axis 716, each of which includes a convexly-curved bearing surface 788. The radial bearing apparatus 700 may further include an outer race 790 (i.e., a stator) that extends about and receives the inner race 782. The outer race 790 may include a plurality of circumferentially-adjacent bearing elements 708 distributed about the rotation axis 716, each of which includes a concavely-curved bearing surface 714 curved to correspond to the convexly-curved bearing surfaces 788. The bearing elements 708 and 786 may have a generally cylindrical shape and each may be made from any of the materials discussed above for the bearing elements 108. In other embodiments, the bearing elements 708 and 786 may have a generally wedge-like shape, a generally rectangular shape, a non-cylindrical shape, or any other suitable shape. One or more of the bearing elements 708 and 786 include a corrosion resistant region, as described above. The terms "rotor" and "stator" refer to rotating and stationary components of the radial bearing apparatus 700, respectively. Thus, if the outer race 790 is configured to remain stationary, the outer race 790 may be referred to as the stator and the inner race 782 may be referred to as the rotor.

A shaft or spindle (not shown) may extend through the opening 704 and may be secured to the rotor 782 by press-fitting the shaft or spindle to the rotor 782, threadedly coupling the shaft or spindle to the rotor 782, or another suitable technique. A housing (not shown) may also be secured to the stator 790 using similar techniques.

The radial bearing apparatus 700 may be employed in a variety of mechanical applications. For example, so-called "rotary cone" rotary drill bits, pumps, motors, transmissions, turbines, alternators, or power generation tools may benefit from a radial bearing apparatus discussed herein.

In some embodiments, a thrust-bearing assembly may include one or more sacrificial anodes. Thrust-bearing assemblies including one or more sacrificial anodes may be utilized as an alternative to bearing elements that include a corrosion resistant region or an addition to bearing elements that include a corrosion resistant region. When used in combination with a thrust-bearing assembly, sacrificial anodes are configured to preferentially corrode over cobalt or other metals or metal alloys in the bonding region 109 or in the superhard table 110 found in the table of the bearing elements of the thrust-bearing assembly. The one or more sacrificial anodes may include, but are not limited to a zinc anode, an aluminum anode, or a magnesium anode (e.g., disposed on the support ring).

Figure 8:
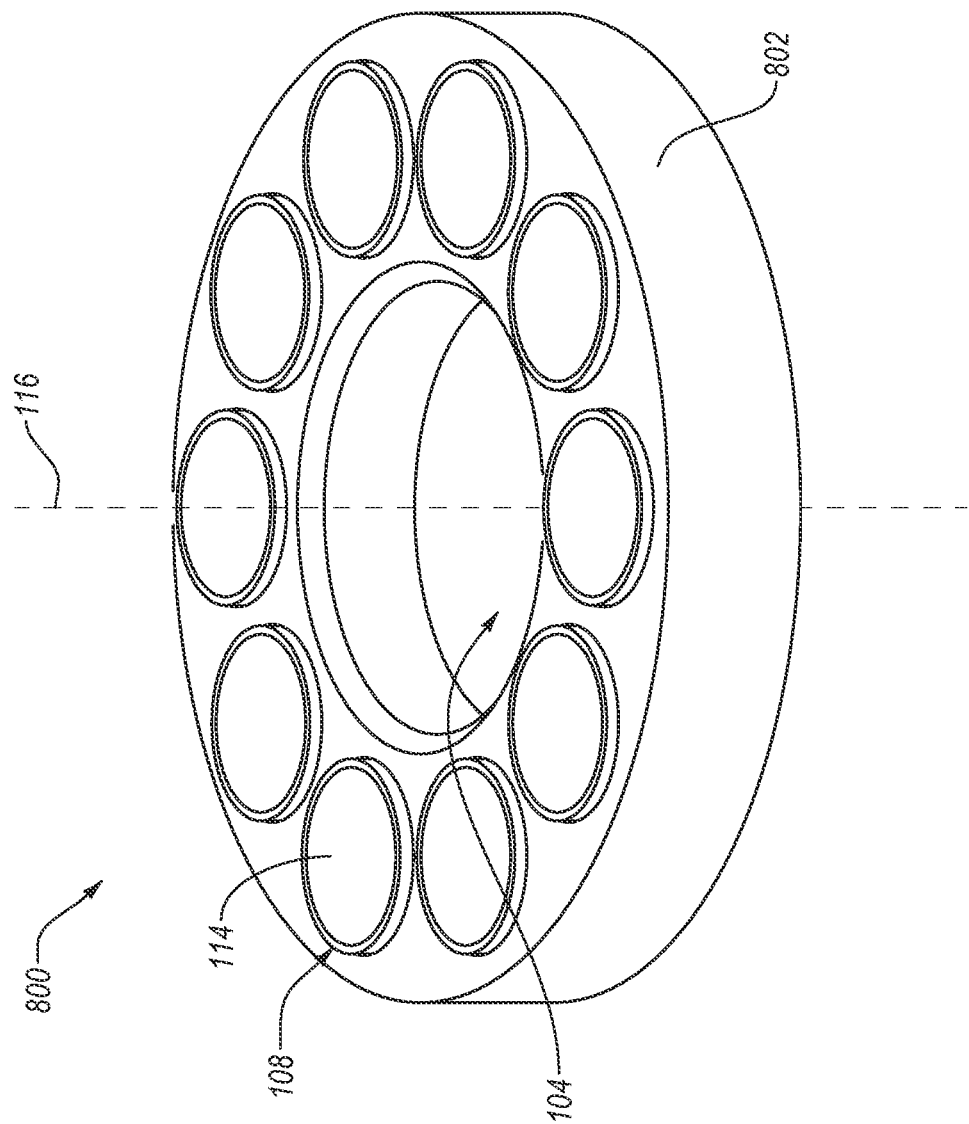
FIG. 8 is an isometric view of a thrust-bearing assembly having a support ring coated with a sacrificial anode, according to an embodiment.

FIG. 8 illustrates a thrust-bearing assembly 800 having a support ring 802 coated at least partially with a sacrificial anode coating, according to an embodiment. Optionally, any of the bearing elements 108 having a corrosion resistant region may be secured to the thrust-bearing assembly 800. Alternatively, the bearing elements 108 may be any suitable conventional bearing element and devoid of a corrosion resistant region. The at least partial coating of the support ring 802 with the sacrificial anode may include a zinc, aluminum, magnesium, combinations thereof, or alloys thereof. In some embodiments, the sacrificial anode coating may include a coating that is deposited on the support ring 802. The sacrificial anode coating including the sacrificial anode deposited on the support ring 802 may be brushed, sprayed, sputtered, vapor deposited, electrostatically deposited, positioned, electroplated, formed upon, electrolessly plated, or dipped onto or adjacent to one or more surfaces of the support ring 802. The thickness of the coating may be about 1 μm or more, such about 1 μm to about 3 mm, about 100 μm to about 2 mm, or about 200 μm to about 1 mm.

In some embodiments, only selected surfaces of the support ring 802 may be coated with the sacrificial anode coating. For example, in an embodiment, only the outer radial surface of the support ring 802 may be coated, while in other embodiments, all or two or more surfaces of the support ring 802 may be coated.

Figure 9:
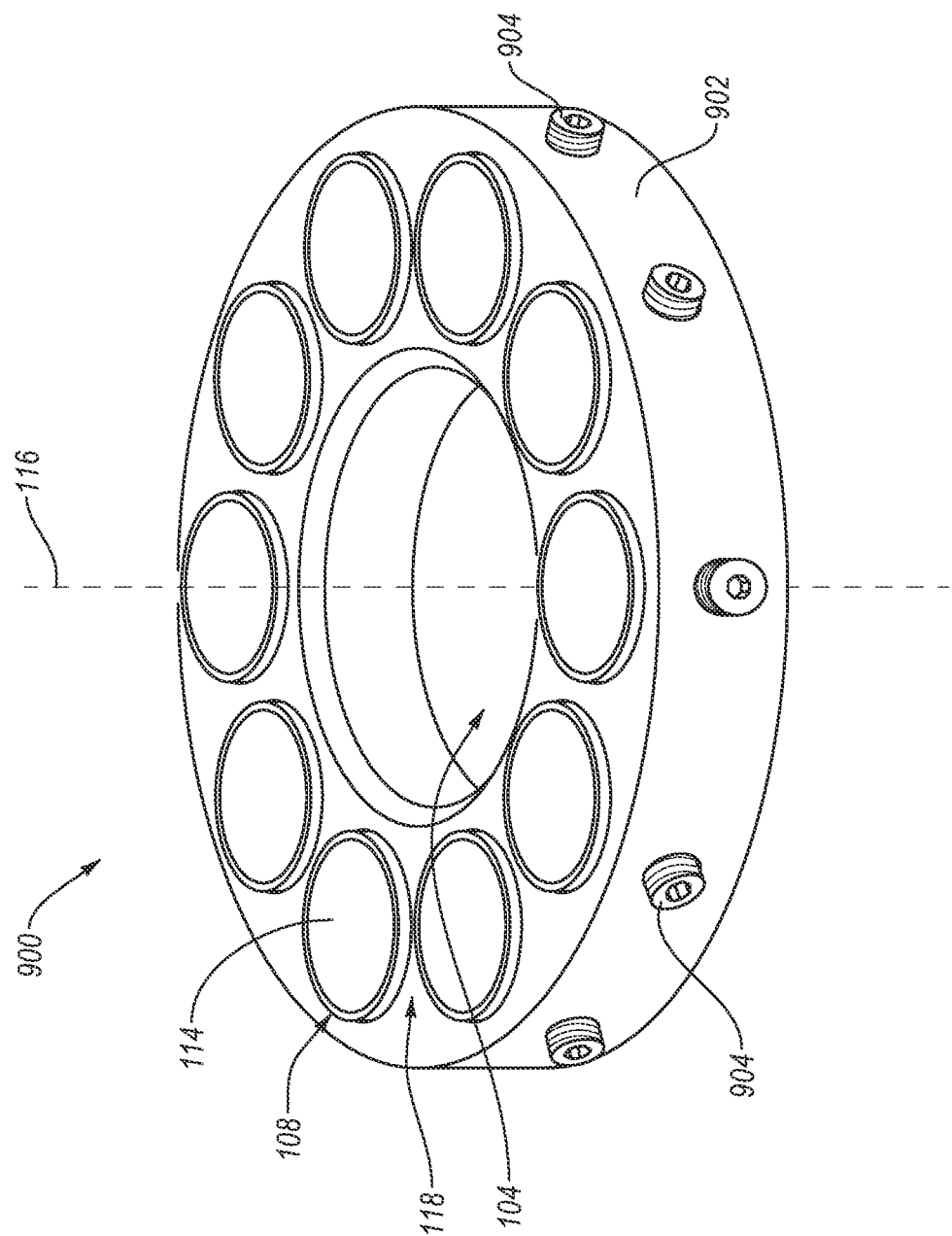
FIG. 9 is an isometric view of a thrust-bearing assembly having multiple sacrificial anodes coupled thereto, according to an embodiment.

FIG. 9 illustrates an embodiment of a thrust-bearing assembly 900 that includes a plurality of sacrificial anodes 904 coupled to the support ring 902 of the thrust-bearing assembly 900. In an embodiment, any of the bearing elements 108 having a corrosion resistant region may be secured to the thrust-bearing assembly 900. In other embodiments, one or more of the bearing elements 108 may be any suitable conventional bearing element and devoid of a corrosion resistant region. Each sacrificial anode 904 may include one of zinc, aluminum, magnesium, combinations thereof, or alloys thereof. In some embodiments, each sacrificial anode 904 may be detachably or otherwise removably coupled to the support ring 902. For example, each sacrificial anode 904 may be configured as a threaded insert, and the support ring 902 may include corresponding female recesses configured to receive and threadedly couple to a sacrificial anode 904. In other embodiments the sacrificial anode may include a plate, sleeve, block, tab, or the like coupled to the support ring 902. For example, in other embodiments, each sacrificial anode may be press fit or brazed into a corresponding recess formed in the support ring 902.

It should be noted that a thrust-bearing apparatus or a radial bearing apparatus may be formed from any combination of any feature of any bearing assemblies disclosed herein.

Figure 10:
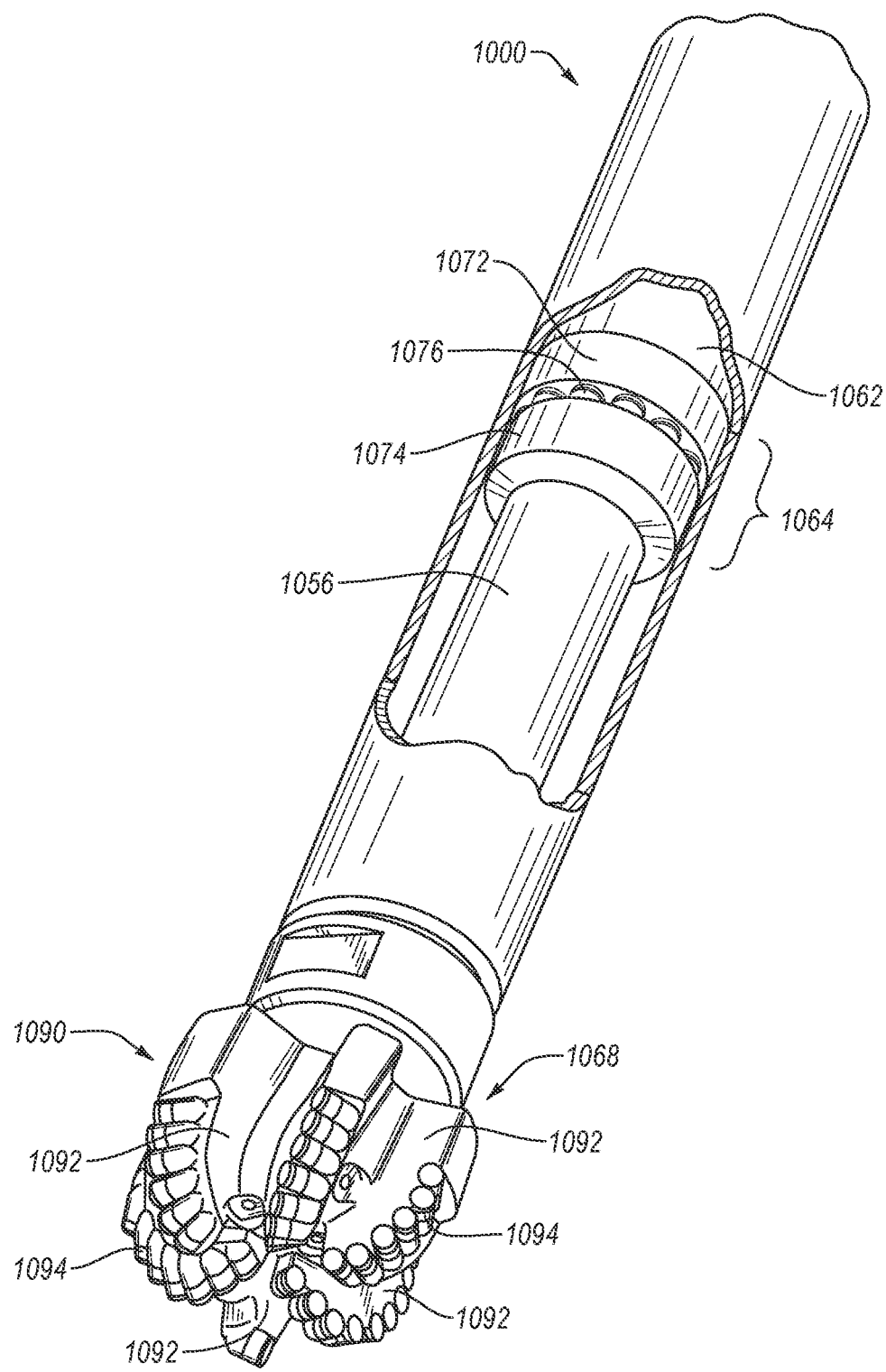
FIG. 10 is a schematic isometric cutaway view of a subterranean drilling system that may utilize any of the disclosed bearing assemblies, according to various embodiments.

Any of the embodiments for bearing apparatuses discussed above may be used in a subterranean drilling system. FIG. 10 is a schematic isometric cutaway view of a subterranean drilling system 1000, according to an embodiment.

The subterranean drilling system 1000 may include a housing 1060 enclosing a downhole drilling motor 1062 (i.e., a motor, turbine, or any other device capable of rotating an output shaft) that may be operably connected to an output shaft 1056. A thrust-bearing apparatus 1064 may be operably coupled to the downhole drilling motor 1062. The thrust-bearing apparatus 1064 may be configured as any of the previously described thrust-bearing apparatus embodiments. A rotary drill bit 1068 may be configured to engage a subterranean formation and drill a borehole and may be connected to the output shaft 1056. The rotary drill bit 1068 is a fixed-cutter drill bit and is shown comprising a bit body 1090 having radially-extending and longitudinally-extending blades 1092 with a plurality of PDCs 1094 secured to the blades 1092. However, other embodiments may utilize different types of rotary drill bits, such as core bits and/or roller-cone bits. As the borehole is drilled, pipe sections may be connected to the subterranean drilling system 1000 to form a drill string capable of progressively drilling the borehole to a greater size or depth within the earth.

The thrust-bearing apparatus 1064 may include a stator 1072 that does not rotate and a rotor 1074 that may be attached to the output shaft 1056 and rotates with the output shaft 1056. As discussed above, the thrust-bearing apparatus 1064 may be configured as any of the embodiments disclosed herein. For example, the stator 1072 may include a plurality of circumferentially-distributed bearing elements 1076 similar to the bearing elements 508 shown and described in the thrust-bearing apparatus 500 of FIG. 5A. The rotor 1074 may include a plurality of circumferentially-distributed bearing elements (not shown) such as shown and described in relation to FIGS. 1A-4D.

In operation, drilling fluid may be circulated through the downhole drilling motor 1062 to generate torque and rotate the output shaft 1056 and the rotary drill bit 1068 attached thereto so that a borehole may be drilled. A portion of the drilling fluid may also be used to lubricate or cool the surfaces of opposing bearing surfaces of the stator 1072 and the rotor 1074. When the rotor 1074 is rotated, grooves of the bearing elements of the rotor 1074 may pump the drilling fluid onto the bearing surfaces of the stator 1072 and/or the rotor 1074, as previously discussed.

Figure 11A:
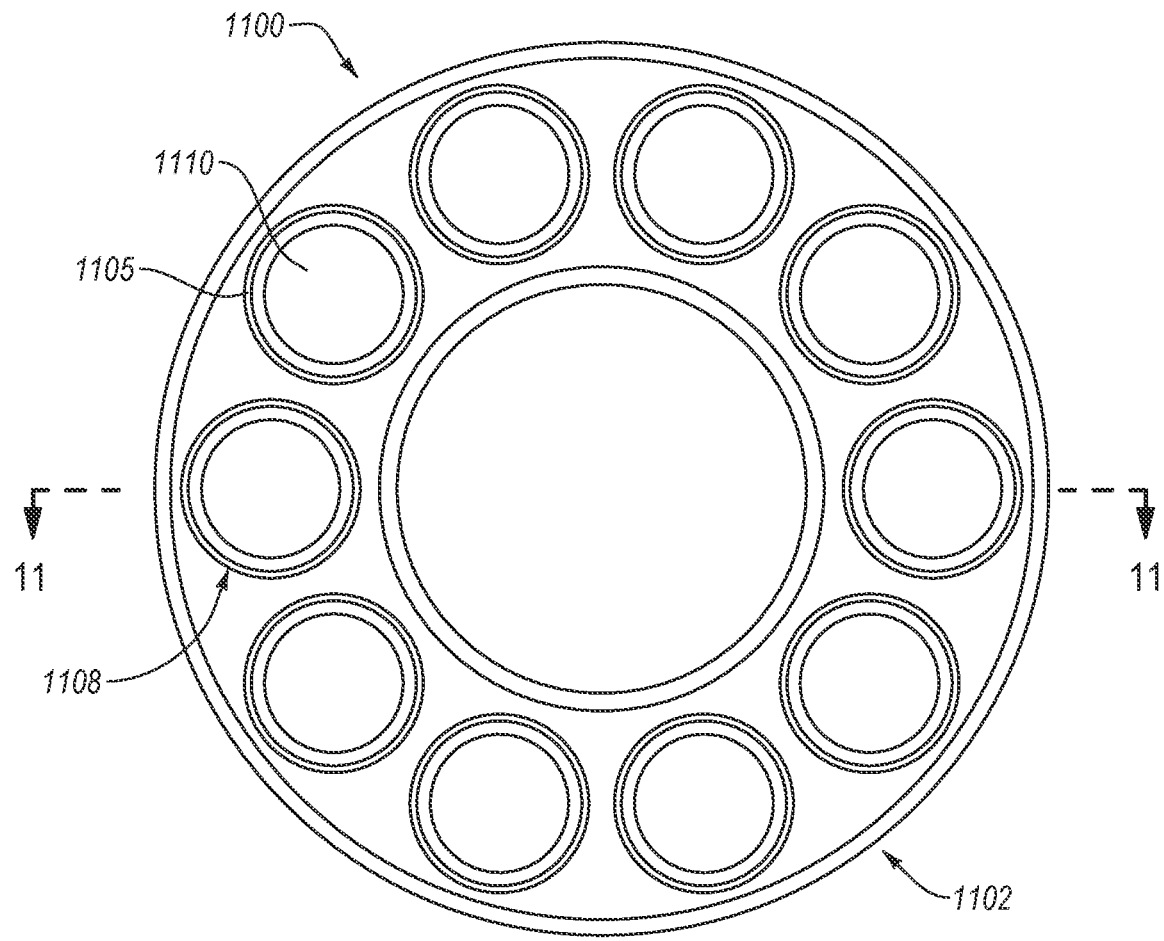
FIG. 11A is a top view of a thrust-bearing assembly having a corrosion resistant region around a portion of each bearing element, according to an embodiment.
Figure 11B:
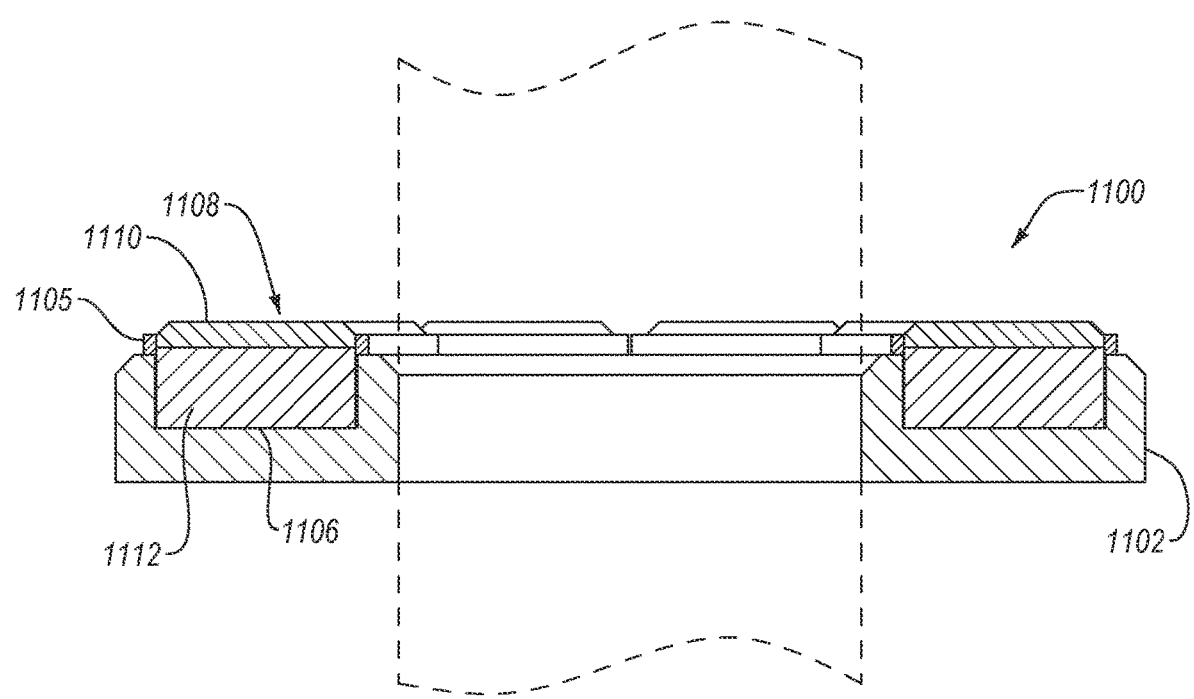
FIG. 11B is a cross-sectional view of the thrust-bearing assembly shown in FIG. 11A taken along line 11-11.

FIGS. 11A and 11B are a top view and a cross-sectional view, respectively, of a bearing assembly 1100, according to an embodiment. Similar to other embodiments described herein, the bearing assembly 1100 includes a support ring 1102 having a plurality of recesses 1106 and a plurality of bearing elements 1108 coupled within the plurality of recesses 1106 as described in other embodiments of this disclosure. Unless otherwise noted, each bearing element 1108 may include any feature or combination of features of any embodiment a bearing element described herein, including a superhard table 1110 and a substrate 1112.

FIG. 11B is a cross-sectional view taken along line 11-11 of the bearing assembly 1100 illustrated in FIG. 11A. The bearing assembly 1100 includes a corrosion resistant region 1105 that is formed subsequent to mounting (e.g., brazing) the bearing elements 1108 to the support ring 1102. Each corrosion resistant region 1105 may include any features or combination of features of other corrosion resistant regions described herein. For example, each corrosion resistant region 1105 may be formed on or attached to the bearing assembly 1100 through one or more of a CVD, physical vapor deposition ("PVD"), electroplating, brazing, mechanical attachment, or combinations thereof.

In the bearing assembly 1100 illustrated in FIG. 11B, after formation, the corrosion resistant region 1105 covers both a portion of the lateral surface of the superhard table 1110 at least proximate to the bonding region of the superhard table 1110 and also a portion of the lateral surface of the substrate 1112 proximate to the interfacial surface thereof. In addition, as shown in FIGS. 11A-11B, the corrosion resistant region 1105 covers a portion of the support ring 1102. More particularly, as shown in FIG. 11B, the corrosion resistant region 1105 may include a portion of the lateral surface of an inner surface adjacent to and bonded to a portion of the lateral surface of the superhard table 1110 and the substrate 1112, an exposed lateral surface opposite to the inner surface, and two surfaces extending between the inner surface and the lateral surface of the corrosion resistant region 1105. A lower surface of the corrosion resistant region 1105 is adjacent to the surface of the support ring 1102, and an upper surface of the corrosion resistant region 1105 is spaced from the lower surface. In the bearing assembly 1100 illustrated in FIGS. 11A and 11B, the superhard table 1110 includes a peripherally extending edge chamfer. However, in other embodiments, the edge chamfer may be omitted.

Although not shown in FIGS. 11A and 11B, in some embodiments, the corrosion resistant region 1105 may be formed subsequent to mounting the bearing elements 1108 to the support ring 1102 and also may cover the exposed surfaces (i.e., exposed after mounting) of the bearing elements 1108. For example, in some embodiments, the corrosion resistant region 1105 may cover the top bearing surface of the superhard table 1110, the lateral surface of the superhard table 1110, and any of the lateral surface of the substrate 1112 positioned outside the recess 1106. If the superhard table 1110 includes an edge chamfer, such as the embodiment illustrated in FIG. 11B, the corrosion resistant region also may cover the edge chamfer of the superhard table 1110. Optionally, the corrosion resistant region 1105 may be removed from the top bearing surface of the superhard table 1110.

Figure 12A:
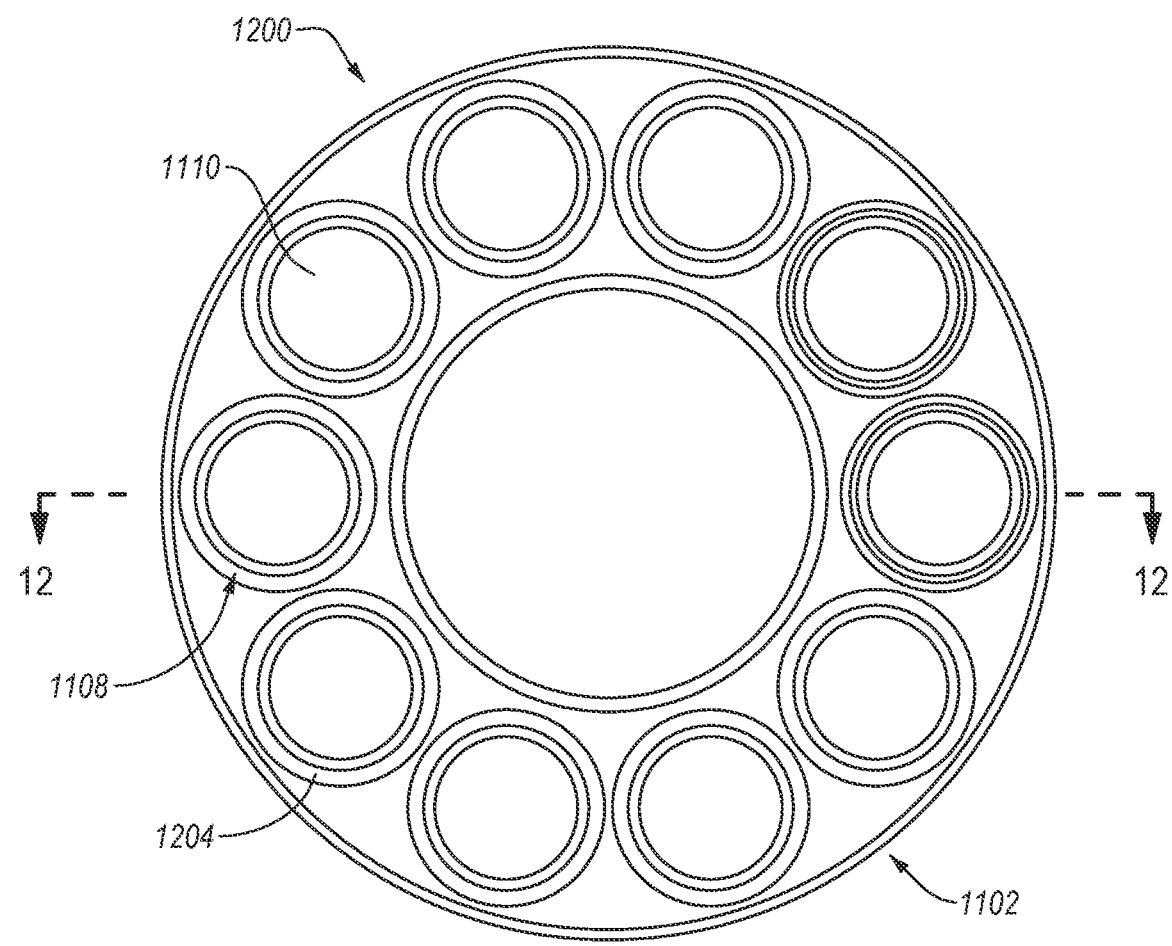
FIG. 12A is a top view of a thrust-bearing assembly having an anode coating on the support ring and a corrosion resistant region around a portion of each bearing element and under the anode coating, according to an embodiment.
Figure 12B:
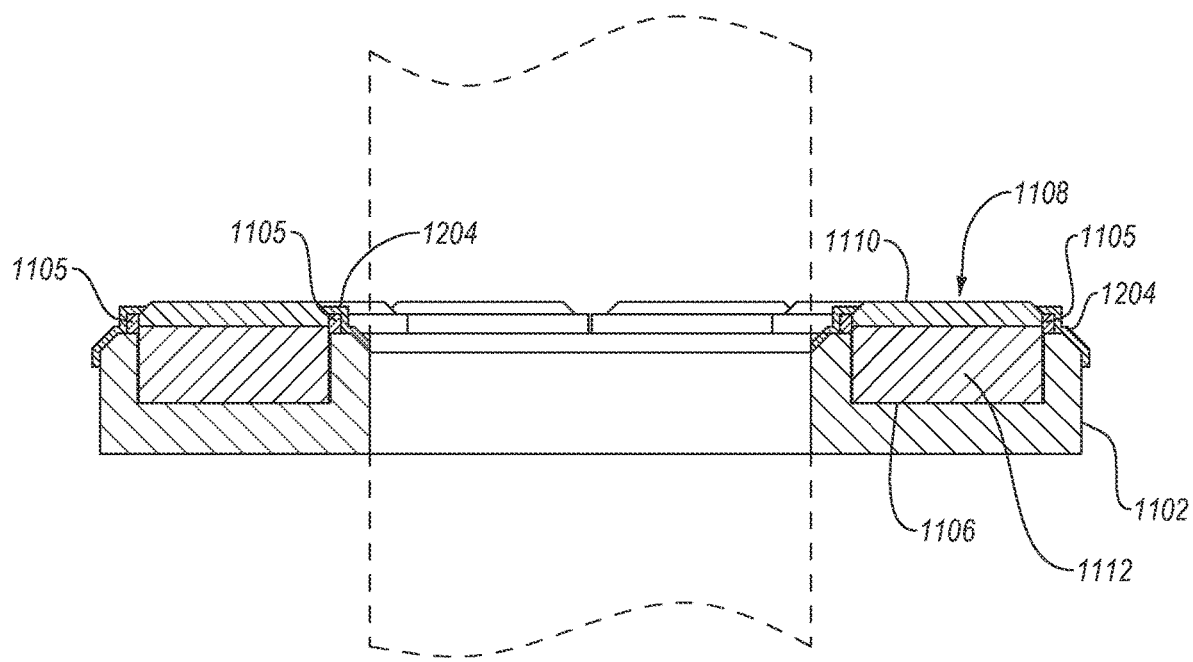
FIG. 12B is a cross-sectional view of the thrust-bearing assembly shown in FIG. 12B taken along line 12-12.

FIGS. 12A and 12B are top and cross-sectional views, respectively, of a bearing assembly 1200, according to an embodiment. Similar to other embodiments described herein, the bearing assembly 1100 includes a support ring 1102 having a plurality of recesses 1106 and a plurality of bearing elements 1108 coupled within the plurality of recesses 1106 as described in other embodiments of this disclosure. Unless otherwise noted, each bearing element 1108 may include any feature or combination of features of any embodiment a bearing element described herein, including a superhard table 1110 and a substrate 1112.

The bearing assembly 1200 also includes the corrosion resistant region 1105. The corrosion resistant region 1105 may be formed subsequent to attaching the bearing elements 1108 to the support ring 1102, as described in relation to the bearing assembly 1100. In other embodiments, however, the corrosion resistant region 1105 may include any other features or configurations of corrosion resistant regions described herein, such as the corrosion resistant regions described in relation FIGS. 2A-4D.

The bearing assembly 1200 also includes an anode coating 1204. Similar to other sacrificial anodes described herein, the anode coating 1204 may be configured to preferentially corrode over cobalt or other metals or metal alloys in the bonding region or in the superhard table 1110 of the bearing elements 1108 of the bearing assembly 1200. The anode coating may include, but is not limited to zinc, aluminum, or magnesium (e.g., disposed on the support ring).

In an embodiments, the anode coating 1204 of bearing assembly 1200 is formed on the bearing assembly 1200 subsequent to mounting the bearing elements 1108 in the recesses 1106 of the support ring 1102. For example, in some embodiments, the corrosion resistant region 1105 is formed on the bearing assembly 1200 subsequent to the coupling the bearing elements 1108 within the recesses 1006 of the support ring, and then the anode coating 1205 is formed on the bearing assembly 1200.

The anode coating 1204 may include a coating that is deposited on a portion of the support ring 1102, the bearing element 1108, and/or the corrosion resistant region 1105. The anode coating 1204 may be one or more of brushed, sprayed, sputtered, vapor deposited, electrostatically deposited, positioned, electroplated, formed upon, electrolessly plated, or dipped onto or adjacent to one or more surfaces of the support ring 1102, the bearing element 1108, and/or the corrosion resistant region 1105. The thickness of the anode coating 1204 may be about 1 µm or more, such about 1 µm to about 3 mm, about 100 µm to about 2 mm, or about 200 µm to about 1 mm.

The anode coating 1204 may cover at least a portion of the previously exposed surface of the corrosion resistant region 1105. For example, in the bearing assembly 1200 illustrated in FIG. 11B, the anode coating 1204 covers the previously exposed lateral surface and the upper surface (described above) of the corrosion resistant region 1105. In some embodiments, where the corrosion resistant region 1105 covers the chamfer edge and/or the bearing surface of the superhard table 1110, the anode coating 1204 also may cover the portion(s) of the corrosion resistant region 1005 covering the chamfer edge and/or the bearing surface of the superhard table 1110. In some embodiments, the anode coating covers only the exposed surfaces of the corrosion resistant region 1105.

In addition to covering any previously exposed portions of the corrosion resistant region 1105, in some embodiments, the anode coating 1204 also covers one or more portions of the support ring 1102. For example, in the bearing assembly 1200 illustrated in FIGS. 12A and 12B, the anode coating 1204 covers at least a portion of a lateral surface 1223 of the support ring 1202, an outer chamfer edge 1222 of the support ring 1102, an intermediate surface 1221 of the support ring 1102, and an inner chamfer edge 1225 of the support ring 1102. In some embodiments, the anode coating 1204 covers at least a portion of an inner surface 1224 of the support ring 1102. In some embodiments, the support ring 1102 does not include the outer chamfer edge 1222 or the inner chamfer edge 1225 and, accordingly, the anode coating 1204 does not cover such chamfer edges.

Also disclosed herein are methods for manufacturing a bearing assembly that includes one or more bearing elements having a corrosion resistant region. In an embodiment, the method includes an act of providing a plurality of bearing elements. Each bearing element of the plurality of bearing elements includes a polycrystalline diamond table, a substrate, and a bonding region defined by the substrate and the polycrystalline diamond table. The polycrystalline diamond table has a bearing surface, and a plurality of bonded diamond grains defining a plurality of interstitial regions at least partially occupied by a metal-solvent catalyst.

The method also includes an act of disposing a corrosion resistant material about at least one bearing element of the plurality of bearing elements to form a corrosion resistant region. The corrosion resistant material covers at least a portion of at least one lateral surface of the bonding region. The corrosion resistant region is configured to prevent corrosion of at least some material covered by the corrosion resistant region when the at least one bearing element is exposed to lubricant.

In some embodiments, the act of disposing a corrosion resistant material about at least one bearing element of the plurality of bearing elements to form a corrosion resistant region may include disposing the corrosion resistant material on at least one lateral surface of the substrate proximate to the bonding region. In some embodiments, the act of disposing a corrosion resistant material about at least one bearing element of the plurality of bearing elements to form a corrosion resistant region may include disposing the corrosion resistant material to form the corrosion resistant region covering substantially all of at least one lateral surface of the polycrystalline diamond table of the at least one bearing element and substantially all of the at least one lateral surface of the substrate of the at least one bearing element. In this and other embodiments, the corrosion resistant region may not cover the base surface of the substrate of the at least one bearing element. In some embodiments, the act of disposing the corrosion resistant material about at least one bearing element of the plurality of bearing elements to form the corrosion resistant region may include disposing the corrosion resistant material to form the corrosion resistant region covering at least a portion of the bearing surface of the polycrystalline diamond table, at least one lateral surface of the polycrystalline diamond table, at least one lateral surface of the substrate, and a base surface of the substrate of the at least one bearing element.

In some embodiments, the act of disposing the corrosion resistant material about the at least one bearing element of the plurality of bearing elements to form the corrosion resistant region may include disposing a ceramic or a refractory metal to form the corrosion resistant region. In some embodiments, the ceramic includes one or more of alumina, silicon carbide, tungsten carbide, or diamond. In some embodiments, the refractory metal includes one or more of tungsten, niobium, molybdenum, zirconium, tantalum, vanadium, or chromium.

In some embodiments the act of disposing the corrosion resistant material about the at least one bearing element of the plurality of bearing elements to form the corrosion resistant region may include depositing the corrosion resistant material as a coating on at least the portion of at least one lateral surface of the bonding region to form the corrosion resistant region. In some embodiments, the act of disposing the corrosion resistant material about the at least one bearing element of the plurality of bearing elements to form the corrosion resistant region may include disposing a ring including the corrosion resistant material about at least the portion of at least one lateral surface of the bonding region to form the corrosion resistant region. In some embodiments, disposing the ring including the corrosion resistant material about the at least the portion of the at least one lateral surface of the bonding region to form the corrosion resistant region may include press-fitting the ring onto at least the polycrystalline diamond table.

The method also may include securing the plurality of bearing elements circumferentially about an axis of a support ring, for example, brazing the plurality of bearing elements within a plurality of recesses in the support ring. In some embodiments, the method also may include an act of forming one or more corrosion resistant regions after brazing or otherwise securing the plurality of bearing elements to the support ring. The one or more corrosion resistant regions may be formed, for example, by PVD, CVD, coating, electroplating, etc. The one or more corrosion resistant regions may be formed around a portion of the bearing element to cover both a portion of the lateral surface of the superhard table at least proximate to the bonding region of the superhard table and also a portion of the lateral surface of the substrate proximate to the interfacial surface thereof. In some embodiments, the one or more corrosion resistant regions also may cover all of the previously exposed surfaces of the bearing elements, such as the top bearing surface of the superhard table, the lateral surface of the superhard table, and any of the lateral surface of the substrate positioned outside the support ring.

The method also may include an act of forming, subsequent to brazing or otherwise securing the bearing elements to the support ring, an anode coating that covers at least one or more exposed surfaces of the corrosion resistant regions. In some embodiments, the anode coating covers all previously exposed surfaces of the corrosion resistant regions, as well as portions of the support ring proximate to the bearing elements. For example, the anode coating may cover any exposed surfaces of the corrosion resistant regions, at least a portion of the lateral surface of the support ring, an intermediate surface of the support ring, or any edge chamfers of the support ring.

Also disclosed herein are methods for manufacturing a bearing assembly that includes one or more sacrificial anodes. In some embodiments, the method also may include an act of coupling one or more sacrificial anodes to the support ring or otherwise disposing one or more sacrificial anodes on the support ring. In some embodiments, the act of disposing the one or more sacrificial anodes on the support ring includes disposing at least one of a zinc anode, an aluminum anode, or a magnesium anode to the support ring. In some embodiments, the act of disposing the one or more sacrificial anodes on the support ring includes coating at least a portion of the support ring with the one or more sacrificial anodes. In some embodiments, the act of disposing the one or more sacrificial anodes on the support ring includes coating substantially all of the support ring with the one or more sacrificial anodes. In some embodiments, the act of disposing the one or more sacrificial anodes on the support ring includes detachably coupling the one or more sacrificial anodes to the support ring. In some embodiments, the method also can include removing at least one of the one or more sacrificial anodes and replacing the at least one of the one or more sacrificial anodes with an unconsumed, replacement sacrificial anode.

The method also includes an act of mounting the plurality of bearing elements to a support ring so that the plurality of bearing elements are circumferentially about an axis of the support ring. The method also may include an act of disposing a corrosion resistant material to form a corrosion resistant region as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
a support ring; and
a plurality of bearing elements mounted to and distributed circumferentially about an axis of the support ring, at least one bearing element of the plurality of bearing elements including:
    a polycrystalline diamond table having a bearing surface, the polycrystalline diamond table including a plurality of bonded diamond grains defining a plurality of interstitial regions at least partially occupied by a metal-solvent catalyst;
    a substrate disposed at least partially in the support ring and bonded to the polycrystalline diamond table;
at least one corrosion resistant region including a corrosion resistant material that covers at least a portion of the at least one bearing element and at least a portion of the support ring; and
a sacrificial anode covering the at least one corrosion resistant region and covering at least some of the support ring.

2. The bearing assembly of claim 1, wherein:
the substrate is bonded to the polycrystalline diamond table at a bonding region between the polycrystalline diamond table and the substrate; and
the at least one corrosion resistant region covers the bonding region between the polycrystalline diamond table and the substrate of the at least one bearing element.

3. The bearing assembly of claim 2, wherein:
the support ring includes a plurality of recesses extending inward from a first surface of the support ring and distributed circumferentially about the axis of the support ring, the plurality of bearing elements being disposed at least partially in the plurality of recesses; and
the at least one corrosion resistant region covers at least a portion of the first surface of support ring.

4. The bearing assembly of claim 1, wherein:
each bearing element of the plurality of bearing elements including:
    a polycrystalline diamond table having a bearing surface, the polycrystalline diamond table including a plurality of bonded diamond grains defining a plurality of interstitial regions at least partially occupied by a metal-solvent catalyst; and
    a substrate disposed at least partially in the support ring and bonded to the polycrystalline diamond table; and
the at least one corrosion resistant region includes a plurality of corrosion resistant regions, each corrosion resistant region of the plurality of corrosion resistant regions including a corrosion resistant material that covers at least a portion of the support ring and at least a portion of a different bearing element of the plurality of bearing elements.

5. The bearing assembly of claim 4, wherein:
the support ring includes a plurality of recesses extending inward from a first surface of the support ring and distributed circumferentially about the axis of the support ring, the plurality of bearing elements being disposed at least partially in the plurality of recesses; and each corrosion resistant region of the plurality of corrosion resistant regions covers at least a portion of the first surface of support ring.

6. The bearing assembly of claim 4, wherein gaps are located circumferentially between adjacent corrosion resistant regions of the plurality of corrosion resistant regions.

7. The bearing assembly of claim 1, wherein the corrosion resistant material includes one or more refractory metals including at least one of tungsten, niobium, molybdenum, zirconium, tantalum, vanadium, or chromium.

8. The bearing assembly of claim 1, wherein the corrosion resistant region includes a coating including the corrosion resistant material.

9. The bearing assembly of claim 1, wherein the corrosion resistant region includes a ring including the corrosion resistant material.

10. A method for manufacturing a bearing assembly, the method comprising:
providing a plurality of bearing elements, each bearing element of the plurality of bearing elements including:
a polycrystalline diamond table having a bearing surface, the polycrystalline diamond table including a plurality of bonded diamond grains defining a plurality of interstitial regions at least partially occupied by a metal-solvent catalyst;
a substrate bonded to the polycrystalline diamond table; and
securing the plurality of bearing elements to a support ring such that the substrate is at least partially disposed in the support ring;
forming a corrosion resistant region that covers at least a portion of the at least one bearing element and at least a portion of the support ring; and
covering the at least one corrosion resistant region and at least some of the support ring with a sacrificial anode.

11. The method of claim 10, wherein forming a corrosion resistant region that covers at least a portion of the at least one bearing element and at least a portion of the support ring includes:
forming a corrosion resistant region that covers at least the portion of the support ring and at least a bonding region positioned between the polycrystalline diamond table and the substrate.

12. The method of claim 11, wherein:
securing the plurality of bearing elements to a support ring such that the substrate is at least partially disposed in the support ring includes:
securing the plurality of bearing elements in a plurality of recesses in the support ring and distributed circumferentially about an axis of the support ring, the recesses extending inward from a first surface of the support ring; and
forming a corrosion resistant region that covers at least a portion of the at least one bearing element and at least a portion of the support ring includes:
forming a corrosion resistant region that covers at least a portion of the first surface of the support ring and at least the bonding region positioned between the polycrystalline diamond table and the substrate.

13. The method of claim 10, wherein:
the at least one bearing element of the plurality of bearing elements includes each bearing element of the plurality of bearing elements including:
a polycrystalline diamond table having a bearing surface, the polycrystalline diamond table including a plurality of bonded diamond grains defining a plurality of interstitial regions at least partially occupied by a metal-solvent catalyst; and
a substrate disposed at least partially in the support ring and bonded to the polycrystalline diamond table; and
forming a corrosion resistant region that covers at least a portion of the at least one bearing element and at least a portion of the support ring includes:
forming a plurality of corrosion resistant regions that each cover at least a portion of the support ring and at least a portion of a different bearing element of the plurality of bearing elements.

14. The method of claim 13, forming a plurality of corrosion resistant regions that each cover at least a portion of the support ring and at least a portion of a different bearing element of the plurality of bearing elements includes:
forming a plurality of corrosion resistant regions that each cover at least a portion of the support ring and at least a portion of a different bearing element of the plurality of bearing elements, with gaps being located circumferentially between adjacent corrosion resistant regions of the plurality of corrosion resistant regions.

15. The method of claim 10, wherein the corrosion resistant material includes one or more refractory metals including at least one of tungsten, niobium, molybdenum, zirconium, tantalum, vanadium, or chromium.

16. The method of claim 10, wherein forming a corrosion resistant region that covers at least a portion of the at least one bearing element and at least a portion of the support ring includes:
coating at least a portion of at least one bearing element of the plurality of bearing elements with the corrosion resistant material to form the corrosion resistant region that covers at least the portion of the at least one bearing element and at least the portion of the support ring.

17. The method of claim 10, wherein forming a corrosion resistant region that covers at least a portion of the at least one bearing element and at least a portion of the support ring includes:
disposing a ring of corrosion resistant material about at least one bearing element of the plurality of bearing elements to form the corrosion resistant region that covers at least the portion of the at least one bearing element and at least the portion of the support ring.

18. A bearing assembly, comprising:
a support ring; and
a plurality of bearing elements mounted to and distributed circumferentially about an axis of the support ring, at least one bearing element of the plurality of bearing elements including:
a polycrystalline diamond table having a bearing surface and a peripheral surface, the polycrystalline diamond table including a plurality of bonded diamond grains defining a plurality of interstitial regions at least partially occupied by a metal-solvent catalyst; and
a substrate disposed at least partially in the support ring and bonded to the polycrystalline diamond table;
at least one corrosion resistant region including a corrosion resistant material that covers at least a portion of the peripheral surface of the polycrystalline diamond table of the at least one bearing element; and
a sacrificial anode covering the at least one corrosion resistant region and covering at least some of the support ring.

* * * * *